United States Patent
Yamane

(10) Patent No.: US 11,642,784 B2
(45) Date of Patent: May 9, 2023

(54) DATABASE CONSTRUCTION FOR CONTROL OF ROBOTIC MANIPULATOR

(71) Applicant: Honda Motor Co., Ltd., Tokyo (JP)

(72) Inventor: Katsu Yamane, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 17/018,925

(22) Filed: Sep. 11, 2020

(65) Prior Publication Data
US 2021/0370506 A1     Dec. 2, 2021

Related U.S. Application Data

(60) Provisional application No. 63/032,168, filed on May 29, 2020.

(51) Int. Cl.
*B25J 9/16*      (2006.01)
*B25J 13/06*      (2006.01)
(Continued)

(52) U.S. Cl.
CPC .............. *B25J 9/1658* (2013.01); *B25J 13/06* (2013.01); *G05B 19/4155* (2013.01);
(Continued)

(58) Field of Classification Search
CPC . B25J 13/06; B25J 13/02; B25J 9/1689; B25J 9/1607; B25J 9/1664; B25J 13/089;
(Continued)

(56) References Cited

U.S. PATENT DOCUMENTS 9,052,710 B1 *   6/2015   Farwell ................ G05B 19/423
2011/0238079 A1 *   9/2011   Hannaford ............. A61B 34/76
                                                                   606/130
(Continued)

OTHER PUBLICATIONS

Campbell et al., "Probabilistic Multimodal Modeling for Human-Robot Interaction Tasks", Aug. 14, 2019, School of Computing, Informatics, and Decision Systems Engineering, Arizona State University, arXiv:1908.04955 (Year: 2019).*
(Continued)

*Primary Examiner* — Khoi H Tran
*Assistant Examiner* — Tanner L Cullen
(74) *Attorney, Agent, or Firm* — Aaron Fong; American Honda Motor Co., Inc.

(57) ABSTRACT

An electronic apparatus for a database construction and control of a robotic manipulator is provided. The electronic apparatus stores information associated with a task of a robotic manipulator. The electronic apparatus further receives a first plurality of signals from a first plurality of sensors associated with a wearable device. The electronic apparatus further applies a predefined model on a first set of signals of the first plurality of signals. The electronic apparatus further determines arrow direction information based on the application of the predefined model on the first set of signals. The electronic apparatus further aggregates the determined arrow direction information with information about the first set of signals to generate output information. The electronic apparatus further stores the generated output information for each of a first plurality of poses performed for the task using the wearable device.

18 Claims, 11 Drawing Sheets

(51) Int. Cl.
  *G06F 3/0346*  (2013.01)
  *G05B 19/4155* (2006.01)
  *G06F 3/038*   (2013.01)
(52) U.S. Cl.
  CPC .......... *G06F 3/0346* (2013.01); *G06F 3/0383* (2013.01); *G05B 2219/40264* (2013.01)
(58) Field of Classification Search
  CPC .......... B25J 9/1658; B25J 9/0081; B25J 3/04; G05B 19/4155; G05B 2219/35448; G05B 2219/36436; G05B 2219/35464; G05B 2219/40264; G05B 19/427; G06F 3/0346; G06F 3/014; G06F 3/012; G06F 3/017; G06F 3/0383; G06F 3/011; A61B 34/35
  See application file for complete search history.

(56) References Cited

U.S. PATENT DOCUMENTS

| | | | | |
|---|---|---|---|---|
| 2012/0143374 | A1* | 6/2012 | Mistry | B62D 57/032 901/47 |
| 2014/0371906 | A1* | 12/2014 | Barajas | G06F 3/014 700/257 |
| 2015/0251316 | A1* | 9/2015 | Smith | B25J 9/1625 901/46 |
| 2017/0055883 | A1* | 3/2017 | Lee | B25J 3/04 |
| 2017/0121129 | A1* | 5/2017 | Mylonas | B65G 51/03 |
| 2017/0249561 | A1* | 8/2017 | Abdallah | B25J 9/0081 |
| 2020/0055195 | A1* | 2/2020 | Ignakov | B25J 13/06 |
| 2020/0237467 | A1* | 7/2020 | Savaii | A61B 34/30 |
| 2020/0390510 | A1* | 12/2020 | Thompson | A61B 34/74 |

OTHER PUBLICATIONS

Mohr, et al., "Computer-Enhanced "Robotic" Cardiac Surgery: Experience In 148 Patients", The Journal Of Thoracic And Cardiovascular Surgery, May 1, 2001, pp. 842-853, vol. 121, No. 5.
Thomas B. Sheridan, "Space Teleoperation Through Time Delay: Review and Prognosis", IEEE Transactions on Robotics and Automation, Apr. 26, 1993, pp. 592-606, vol. 9, No. 5.
Robin Roberson Murphy, "Human-Robot Interaction in Rescue Robotics", IEEE Transactions on Systems, Man, and Cybernetics, Part C (Applications and Reviews), May 2, 2004, pp. 138-153, vol. 34, No. 2.
Ristoffersson, et al., "A Review of Mobile Robotic Telepresence", Advances in Human-Computer Interaction, 2013, vol. 2013.
Massie, et al., "The Phantom Haptic Interface: A Device for Probing Virtual Objects", Proceedings of the ASME Winter Annual Meeting, Symposium on Haptic Interfaces for Virtual Environment and Teleoperator Systems, Nov. 1994, pp. 295-300, vol. 55, No. 1.
Zhang, et al., "Deep Imitation Learning for Complex Manipulation Tasks from Virtual Reality Teleoperation", IEEE International Conference on Robotics and Automation (ICRA), May 2018, pp. 1-8.
Lipton, et al., "Baxter's Homunculus: Virtual Reality Spaces for Teleoperation in Manufacturing", IEEE Robotics and Automation Letters, IEEE Robotics and Automation Letters, Jan. 2018, pp. 179-186, vol. 3, No. 1.
Schiele, et al., "The ESA Human Arm Exoskeleton for Space Robotics Telepresence", 7th International Symposium on Artificial Intelligence, Robotics and Automation in Space, May 2003, pp. 19-23.
Miller, et al., "Motion Capture From Inertial Sensing For Untethered Humanoid Teleoperation", 4th IEEE/RAS International Conference on Humanoid Robots, Nov. 2004, pp. 547-565, vol. 2.
Campbell, et al., "Bayesian Interaction Primitives: A Slam Approach To Human-Robot Interaction", Conference on Robot Learning, Oct. 2017, pp. 379-387.
Campbell, et al., "Probabilistic Multimodal Modeling for Human-Robot Interaction Tasks", Robotics: Science and Systems, Jun. 2019, pp. 1-9.
Campbell, et al., "Learning Interactive Behaviors for Musculoskeletal Robots Using Bayesian Interaction Primitives", IEEE/RSJ International Conference on Intelligent Robots and Systems, Nov. 2019, pp. 1-8.
Campbell, et al., "Learning Whole-Body Human-Robot Haptic Interaction in Social Contexts", IEEE International Conference on Robotics and Automation, May 26, 2020, pp. 1-7.
Rose, et al., "Artist-Directed Inverse-Kinematics Using Radial Basis Function Interpolation", Computer Graphics Forum, 2001, pp. 1-13.
D'souza, et al., "Learning Inverse Kinematics", IEEE/RSJ International Conference on Intelligent Robots and Systems, Nov. 2001, pp. 298-303, vol. 1.
Growchow, et al., "Style-Based Inverse Kinematics", ACM, 2004, pp. 521-531.
Artemiadis, et al., "A Biomimetic Approach To Inverse Kinematics For A Redundant Robot Arm", Autonomous Robots, Jun. 23, 2010, pp. 293-308, vol. 29, No. 3-4.
Kwon, et al., "Natural Movement Generation Using Hidden Markov Models And Principal Components", IEEE Transactions on Systems, Man, and Cybernetics, Part B (Cybernetics), Oct. 2008, pp. 1184-1194, vol. 8, No. 5.
Calinon, et al., "A Probabilistic Programming By Demonstration Framework Handling Constraints In Joint Space And Task Space", 2008 IEEE/RSJ International Conference on Intelligent Robots and Systems, Sep. 2008, pp. 367-372.
Reinhart, et al., "Reaching Movement Generation With A Recurrent Neural Network Based On Learning Inverse Kinematics For The Humanoid Robot Icub", 2009 9th IEEE-RAS International Conference on Humanoid Robots, Dec. 2009, pp. 323-330.
Ijspeert, et al., "Movement Imitation With Nonlinear Dynamical Systems In Humanoid Robots", Proceedings 2002 IEEE International Conference on Robotics and Automation, May 2002, pp. 1398-1403, vol. 25, No. 2.
Ijspeert, et al., "Dynamical Movement Primitives: Learning Attractor Models for Motor Behaviors", Neural Computation, 2013, pp. 328-373.
Yamane, et al., "Synthesizing Object Receiving Motions Of Humanoid Robots With Human Motion Database", IEEE International Conference on Robotics and Automation, May 2013, pp. 1629-1636.
Prada, et al., "Dynamic Movement Primitives for Human-Robot interaction: Comparison with Human Behavioral Observation", 2013 IEEE/RSJ International Conference on Intelligent Robots and Systems, Nov. 2013, pp. 1168-1175.
Amor, et al, "Interaction Primitives For Human-Robot Cooperation Tasks", 2014 IEEE international conference on robotics and automation (ICRA), Jun. 2014, pp. 2831-2837.
Maeda, et al., "Probabilistic Movement Primitives For Coordination Of Multiple Human-Robot Collaborative Tasks", Autonomous Robots, 2017, pp. 593-612.
Geir Evensen, "The Ensemble Kalman Filter: Theoretical Formulation And Practical Implementation", Ocean Dynamics, Nov. 2013, pp. 343-367, vol. 53, No. 4.
Yoshihiko Nakamura, "Advanced Robotics: Redundancy and Optimization (Addison-Wesley series in electrical and computer engineering)", Addison-Wesley publishing company Control Engineering, 1991.
Tolani, et al., "Real-Time Inverse Kinematics of the Human Arm", Presence: Teleoperators & Virtual Environments, Jan. 1996, pp. 393-401, vol. 5, No. 4.
Li, et al., "Resolving The Redundancy Of A Seven Dof Wearable Robotic System Based On Kinematic And Dynamic Constraint", 2012 IEEE International Conference On Robotics And Automation, May 2012, p. 305-310.
Franka Emika, link: https://www.franka.de/.
Rethink Robotics, link: https://www.rethinkrobotics.com/sawyer.
Nishiwaki, et al., "Design And Development Of Research Platform For Perception-Action Integration In Humanoid Robot: H6", Proceedings of the 2000 IEEE/RSJ International Conference on Intelligent Robots and Systems (IROS 2000)(Cat. No. OOCH37113), Oct.-Nov. 2000, pp. 1559-1564, vol. 3.

(56) References Cited

OTHER PUBLICATIONS

Rader, et al., "Design Of A High-Performance Humanoid Dual Arm System With Inner Shoulder Joints" 2016 IEEE-RAS 16th International Conference on Humanoid Robots (Humanoids), Nov. 2016, pp. 523-529.
Yoshiike, et al., "Development Of Experimental Legged Robot For Inspection And Disaster Response In Plants", 2017 IEEE/RSJ International Conference on Intelligent Robots and Systems (IROS), Sep. 2017, pp. 4869-4876.
Inertiallabs, link: https://inertiallabs.com/products/3os/.
Naturalpoint, Inc., link: https://optitrack.com/hardware/.
Touchence Inc., link: http://touchence.jp/en/cube/index.html.

* cited by examiner

DATABASE CONSTRUCTION FOR CONTROL OF ROBOTIC MANIPULATOR

CROSS-REFERENCE TO RELATED APPLICATION

This application claims the benefit of U.S. Provisional Patent Application No. 63/032,168, filed May 29, 2020, which is incorporated by reference herein in its entirety.

BACKGROUND

Generally, robotic manipulators may be remotely operated via an interface to perform a task (such as a pick and place task). For example, the robotic manipulators may include anthropomorphic effectors (such as a humanoid robot). To control the anthropomorphic effectors, the interface may include an input device (such as a joystick) that may be configured to receive a fixed set of user inputs (such as a set of movements of the joystick). The fixed set of user inputs may include inputs related to only six degrees of freedom. Based on the limited number of user inputs, the interface may transmit limited control instructions (such as limited positional and orientational information associated with the task) to control the anthropomorphic effectors of the robotic manipulators. Because of such limitations of the interface, it may be difficult for an operator to communicate with and/or control the robotic manipulators using low-cost interfaces. Additionally, such interfaces may generate unnatural and inconsistent motion information for the robotic manipulators to execute the task.

Further, in order to perform a continuous transition (such as a human-like motion) of the task from the anthropomorphic effectors, the interface may require a complex structural design, to receive the user inputs for such continuous transition, which may eventually increase a cost of the interface. Therefore, there may be a need for a system which may use a cost-effective interface to effectively control the robotic manipulator (such as humanoid robot) to execute the task.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic apparatus to construct a database to control a robotic manipulator is provided. The electronic apparatus may include a memory to store information associated with a task of a robotic manipulator. The electronic apparatus may further include circuitry which may be coupled with the memory. The circuitry may receive a first plurality of signals from a first plurality of sensors associated with a wearable device. The first plurality of signals may correspond to each of a first plurality of poses performed for the task using the wearable device. The circuitry may further apply a predefined model based on a first set of signals of the first plurality of signals for each of the first plurality of poses. The first set of signals may correspond to one or more positional and orientational coordinates of at least one part of the wearable device. The circuitry may further determine arrow direction information based on the application of the predefined model on the first set of signals for each of the first plurality of poses. The arrow direction information may relate to joint angle information for the robotic manipulator to perform the task. The circuitry may further aggregate the determined arrow direction information with information about the first set of signals to generate output information for each of the first plurality of poses. The circuitry may further control the memory to store the generated output information for each of the first plurality of poses performed for the task using the wearable device.

According to another embodiment of the disclosure, a method to construct a database to control a robotic manipulator is provided. The method may be performed in an electronic apparatus. The method may include receiving a first plurality of signals from a first plurality of sensors associated with a wearable device. The first plurality of signals may correspond to each of a first plurality of poses performed for a task using the wearable device. The method may further include applying a predefined model on a first set of signals of the first plurality of signals for each of the first plurality of poses. The first set of signals may correspond to one or more positional and orientational coordinates of at least one part of the wearable device. The method may further include determining arrow direction information based on the application of the predefined model on the first set of signals for each of the first plurality of poses. The arrow direction information may relate to joint angle information for a robotic manipulator to perform the task. The method may further include aggregating the determined arrow direction information with information about the first set of signals to generate output information for each of the first plurality of poses. The method may further include storing, in a memory, the generated output information for each of the first plurality of poses performed for the task using the wearable device.

According to an embodiment of the disclosure, an electronic apparatus having a database to control a robotic manipulator is provided. The electronic apparatus may include a memory to store output information for each of a first plurality of poses performed for a task using a wearable device. The output information may include arrow direction information associated with each of the first plurality of poses performed for the task. The electronic apparatus may further include circuitry coupled to the memory. The circuitry may receive a second plurality of signals from a second plurality of sensors associated with a handheld device. The second plurality of signals may correspond to each of a second plurality of poses performed for the task using the handheld device. The circuitry may further retrieve, from the memory, the stored output information corresponding to a third set of signals of the received second plurality of signals for each of the second plurality of poses. The third set of signals may correspond to one or more positional and orientational coordinates of at least one part of the handheld device. The circuitry may further extract the arrow direction information from the retrieved output information for each of the second plurality of poses. The circuitry may further transmit control instructions to a robotic manipulator to execute the task based on the extracted arrow direction information and the received second plurality of signals for each of the second plurality of poses performed for the task using the handheld device

Figure 1:
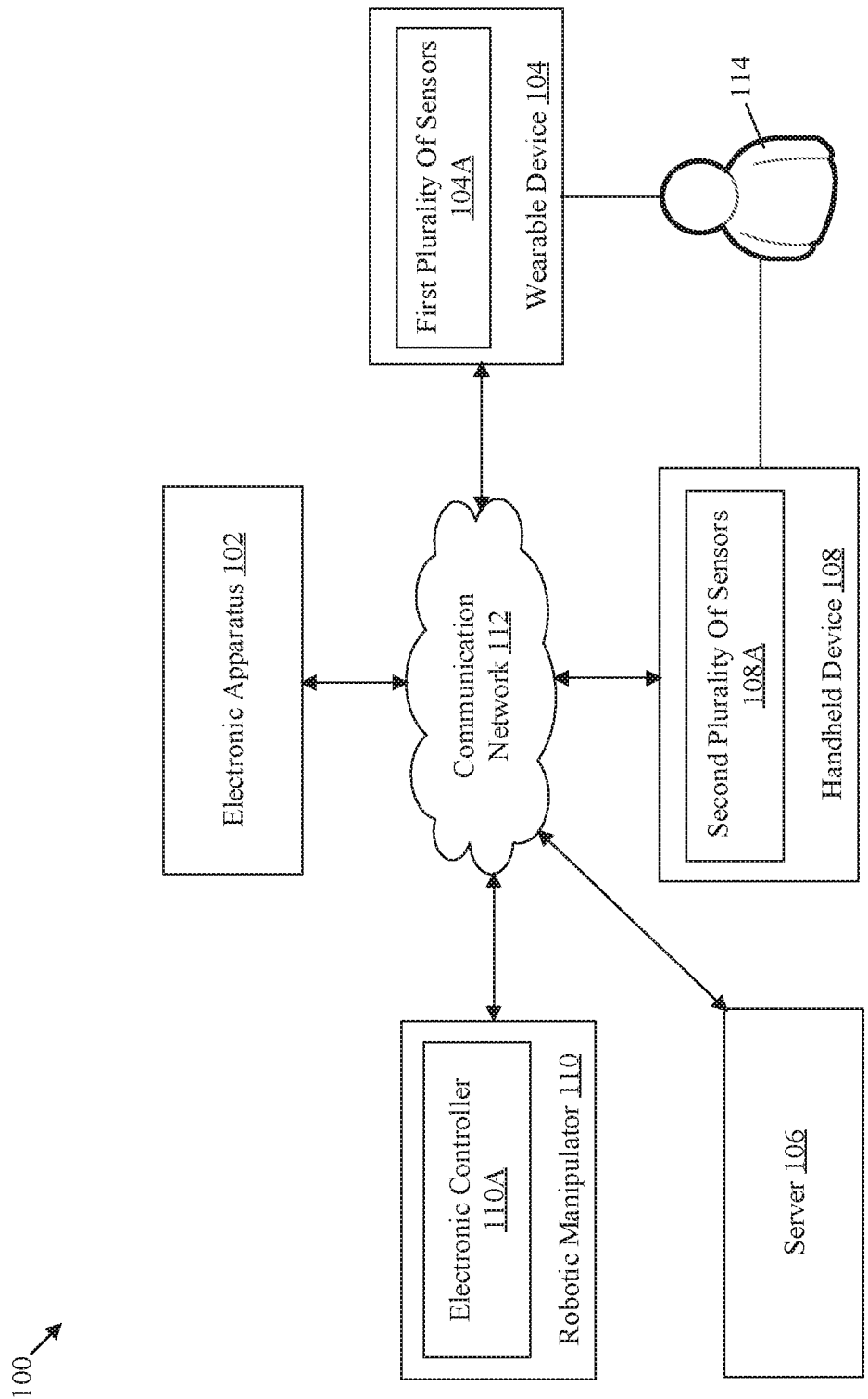
FIG. 1 is a block diagram that illustrates an exemplary network environment for a construction of a database to control a robotic manipulator, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed electronic apparatus for a construction of a database to control a robotic manipulator. Exemplary aspects of the disclosure may provide an electronic apparatus (such as a computing device) that may be configured to store information associated with a task (such as a pick and place task) of a robotic manipulator (such as an anthropomorphic robot). The electronic apparatus may receive a first plurality of signals (that may include a first set of signals that may correspond to positional and orientational coordinates) from a first plurality of sensors (such as Inertial Motion Unit (IMU) sensor) which may be associated with or positioned on a wearable device (such as an exoskeleton, a wearable jacket, a wearable pant, and the like). The wearable device may acquire the first set of signals based on a plurality of poses (including a first set of poses that may correspond to an effector pose) that may be performed by an operator for the task using the wearable device. The first plurality of sensors acquires each pose of the first set of poses from at least one part of the wearable device to form natural and consistent information of the task.

The electronic apparatus may further apply a predefined model (such as Inverse Kinematics Algorithm and a Bayesian Interaction Primitive (BIP)) on the first set of signals. The electronic apparatus may further determine arrow direction information based on the application of the predefined model on the first set of signals for each of the first set of poses. The arrow direction information may relate to joint angle information for the robotic manipulator to perform the task, where the arrow direction information may be invariant from a number of joints or a structure associated with the robotic manipulator. Thus, the determined arrow direction information may be provided to any robotic manipulator irrespective of the number of joints or the structure associated with the robotic manipulator.

The electronic apparatus may further aggregate the determined arrow direction information with information about the first set of signals (and with object information indicating at least one of: a grasp force, a head pose, or an object pose) to generate output information for each of the first set of poses performed using the wearable device. The electronic apparatus may further control the memory to store the generated output information for each of the first set of poses performed for the task using the wearable device. The stored output information in the memory may form a database that may include information related to each pose of the first set of poses of the at least one part of the wearable device. Thus, the database may form natural and consistent information for the robotic manipulator to perform the task.

Therefore, the disclosed electronic apparatus may construct the database, such that, during a runtime operation of control (or teleoperation) of the robotic manipulator using a handheld device (such as cost-effective VR device or interface), the electronic apparatus may compare the first set of signals associated with the output information stored in the database, with signals associated with an effector pose performed for the task using the handheld device, and accordingly retrieve the stored arrow direction information (i.e. from the database) corresponding to the effector pose of the handheld device. Thus, the electronic apparatus may supplement the effector pose (or trajectories) of the handheld device (which may include six degrees-of-freedom (6-DOF)) with the stored arrow direction information (indicating at least one additional degree-of-freedom (1-DOF)), to form natural and consistent motions for the robotic manipulator which may be controlled (or teleoperated) by the cost-effective handheld device during runtime operation to perform the task (such as, but not limited to, a pick and place task). Details of the electronic apparatus for the construction of the database, and the control of the robotic manipulator using the cost-effective handheld device and the constructed database, are provided, for example, in FIGS. 1-11.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for a construction of a database to control a robotic manipulator, in accordance with an embodiment of the disclosure. There is shown a network environment 100 which may include an electronic apparatus 102. The electronic apparatus 102 may be communicatively coupled with a wearable device 104, a server 106, a handheld device 108, and a robotic manipulator 110, through a communication network 112. The wearable device 104 may include a first plurality of sensors 104A that may be configured to acquire poses performed using the wearable device 104. The wearable device 104 may be worn by a user 114 during the construction of the database. The handheld device 108 may include a second plurality of sensors 108A that may be configured to acquire poses performed using the handheld device 108 during runtime operations of the control (or teleoperation) of the robotic manipulator 110. The handheld device 108 may be held or worn by the user 114 during the control of the robotic manipulator 110. The robotic manipulator 110 may include an electronic controller 110A to communicate with the electronic apparatus 102. Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may not include the server 106, without deviation from the scope of the disclosure.

The electronic apparatus 102 may include suitable logic, circuitry, interfaces and/or code that may be configured to store information associated with a task of the robotic manipulator 110. For example, the task may relate to a pick and place task, which may include, but is not limited to, grasping an object, picking the object from a starting point, carrying the object towards a destination point, and placing the object at the destination point. The electronic apparatus 102 may also store information associated with other tasks for the robotic manipulator 110, which may include, but not limited to, controlling a home-appliance (such as a vacuum machine), tele-operating a patient, and the like. The description of other types of tasks has been omitted from the disclosure for the sake of brevity.

The electronic apparatus 102 may be further configured to communicate between the wearable device 104 and the server 106, through the communication network 112, to construct the database. The construction of the database may primarily include, reception of signals from the first plurality of sensors 104A associated with the wearable device 104, and application of a predefined model on the received signals to generate output information (including arrow direction information) for storage in the database. Details of such construction are further described, for example, in FIGS. 4-6.

The electronic apparatus 102 may be further configured to communicate with the handheld device 108 and the robotic manipulator 110, through the communication network 112, to control the robotic manipulator 110 based on the constructed database. The control of the robotic manipulator 110 may primarily include, reception of signals from the second plurality of sensors 108A associated with the handheld device 108, compare the received signals with the output information of the constructed database, and transmit control instructions for the robotic manipulator 110 based on the comparison, to perform the task. Details of such control are further described, for example, in FIGS. 7-9.

In an embodiment, the electronic apparatus 102 may be a computing device, which may include, but not limited to, an automatic controller, a data processing machine, mainframe machine, a computer work-station, and the like. In yet another embodiment, the electronic apparatus 102 may be a handheld or a portable device. In such case, the examples of the electronic apparatus 102 may include, but are not limited to, a smartphone, a cellular phone, a mobile phone, and/or any electronic device with data processing and networking capabilities. In yet another embodiment, the electronic apparatus 102 may be implemented as a cloud server, which may be utilized to execute various operations through web applications, cloud applications, HTTP requests, repository operations, file transfer, and the like. Examples of the electronic apparatus 102 may include, but are not limited to, a database server, an event server, a file server, a web server, a media server, a content server, an application server, a mainframe server, or a combination thereof. In one or more embodiments, the electronic apparatus 102 may be implemented as a plurality of distributed cloud-based resources.

The wearable device 104 may include suitable logic, circuitry, and/or interfaces that may be configured to generate a first plurality of signals through the first plurality of sensors 104A which may be associated with or positioned on the wearable device 104. In some embodiments, the wearable device 104 may include a communication interface (not shown) or a processor (not shown) to communicate (for example, the generated first plurality of signals) with the electronic apparatus 102, through the communication network 112. In an embodiment, the first plurality of signals may correspond to each of a first plurality of poses performed for the task by the user 114 using the wearable device 104. For example, the wearable device 104 may be worn by the user 114 and generate the first plurality of signals based on the first plurality of poses of the user 114. In some embodiments, the wearable device 104 may be worn on a complete body of the user 114 or may cover certain body parts of the user 114. For example, the wearable device 104 may be worn on an upper portion of the user 114, or on a lower portion of the user 114, or a combination of both. Details of such upper portion and the lower portion are further described, for example in FIGS. 3A-3B. Examples of the wearable device 104 may include, but not limited to, an exoskeleton, a wearable garment, a headgear, a glove, and the like. Details of the wearable device 104 are further described, for example, in FIGS. 3A-3B.

The first plurality of sensors 104A associated with the wearable device 104 may include suitable logic, circuitry, and/or interfaces that may be configured to generate the first plurality of signals based the first plurality of poses of the user 114 performed using the wearable device 104. For example, the first plurality of sensors 104A may be communicatively coupled with the wearable device 104, via a wired or wireless connection (not shown), and may further generate the first plurality of signals based on the first plurality of poses of the user 114 performed using the wearable device 104. The first plurality of signals may include a first set of signals and a second set of signals.

The first set of signals may correspond to one or more positional and orientational coordinates of at least one part of the wearable device 104. The at least one part of the wearable device 104 may relate to at least one effector of the wearable device 104. Details of the at least one part of the wearable device 104 are further described, for example, in FIG. 4. The second set of signals may correspond to object information which may indicate at least one of: a grasp force, a head pose, or an object pose, for each of the first plurality of poses performed for the task using the wearable device 104. The object information corresponding to the second set of signals may be received from the first plurality of sensors 104A for a second set of poses of the first plurality of poses. The second set of poses may be different from the first set of poses (i.e. which may be indicated by the first set of signals). Details of the object information are further described, for example, in FIG. 4.

The first plurality of sensors 104A may detect each pose of the first plurality of poses of the user 114, to generate the first set of signals and the second set of signals of the first plurality of signals. The first plurality of sensors 104A may detect at least one of: inertial motion information, force information, or optical motion information for each pose of the first plurality of poses. The inertial motion information and the optical motion information may include the one or more positional and orientational coordinates, associated with the at least one part of the wearable device 104, for each of the first plurality of poses performed for the task by the user 114 using the wearable device 104. The force information may be associated with the at least one part of the wearable device 104 for each of the first plurality of poses performed for the task. Upon generation of the first plurality of signals, the first plurality of sensors 104A may be further configured to transmit the first plurality of signals, indicating at least one of: the inertial motion information, the force information, or the optical motion information, to the electronic apparatus 102 to determine the arrow direction information. Examples of the first plurality of sensors 104A may include, but is not limited to, an inertial motion unit (IMU) sensor, a force sensor, an optical sensor, and the like.

The IMU sensor of the first plurality of sensors 104A may include suitable logic, circuitry, and/or interfaces that may be configured to detect inertial motion information including the one or more positional and orientational coordinates, associated with the at least one part of the wearable device 104, for each of the first plurality of poses performed for the task. For example, the inertial motion information may include at least one of, an angular rate or an angular orientation that may act on the IMU sensor during a movement (such as the first set of poses of the first plurality of poses) of the user 114 performed using the at least one part of the wearable device 104. For example, the at least one part of the wearable device 104 may relate to at least one effector of the wearable device 104 that may perform the first set of poses of the first plurality of poses. The IMU sensor may generate the first set of signals that may correspond to the one or more positional and orientational coordinates of the first set of poses of the at least one effector of the wearable device 104. The IMU sensor may be a combination of one of, an accelerometer, a gyroscope, and a magnetometer. Examples of the IMU sensor may include, but not limited to, a silicon Micro-Electro-Mechanical Systems (MEMS), a quartz MEMS, a Fiber Optic Gyro (FOG), a Ring Laser Gyro (RLG), and the like.

The force sensor of the first plurality of sensors 104A may include suitable logic, circuitry, and/or interfaces that may be configured to detect force information associated with the at least one part of the wearable device 104 for each of the first plurality of poses performed for the task. For example, the force information may include at least one of, a tensile force, a compression force, a stress, a strain, or a change in pressure that may act on the force sensor during a movement (such as a second set of poses of the first plurality of poses) of the user 114 performed using the at least one part of the wearable device 104. For example, the at least one part of the wearable device 104 may relate to the at least one effector of the wearable device 104 that may perform the second set of poses of the first plurality of poses. The force sensor may generate the second set of signals that may correspond to the object information, which includes at least one of, the grasp force, the head pose, or the object pose force corresponding to the second set of poses of the at least one part (such as the headgear, or the glove) of the wearable device 104. Examples of the force sensor of the first plurality of sensors 104A may include, but not limited to, a Load Cell, a Strain Gage, a Force Sensing Resistor (such as a piezoresistive force sensor), and the like.

The optical sensor of the first plurality of sensors 104A may include suitable logic, circuitry, and/or interfaces that may be configured to detect optical motion information comprising the one or more positional and orientational coordinates, associated with the at least one part of the wearable device 104, for each of the first plurality of poses performed for the task. For example, the optical sensor may include an illuminator and a detector. The illuminator may illuminate a light beam on the wearable device 104. The detector may be configured to detect a change in the light beam and may generate electric signals corresponding to the change in the light beam to generate the optical motion information. The generated optical motion information may relate to the positional and orientational coordinates of the first set of poses of the first plurality of poses performed for the task. In an embodiment, the generated optical motion information may also relate to the object information that may be associated with the second set of poses of the first plurality of poses. Examples of the optical sensor of the first plurality of sensors 104A may include, but not limited to, a photoconductive sensor, a photovoltaic sensor, a photodiode sensor, a phototransistor, and the like.

In another embodiment, the first plurality of sensors 104A may be remotely associated with the wearable device 104. For example, the first plurality of sensors 104A may include an image capturing device (not shown) to remotely detect the pose of the user 114. The image capturing device may include suitable logic, circuitry, and/or interfaces that may be configured to capture one or more images that corresponds to the first plurality of poses of the user 114 performed using the wearable device 104, to generate the first plurality of signals. Examples of the image capturing device may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. In some embodiments, the electronic apparatus 102 may include a plurality of image capturing devices (not shown) arranged at different positions of surroundings of the wearable device 104 to capture the first plurality of poses. In some embodiments, the image capturing device may be a 360-degree camera which may be configured to capture a 360-degree view of the surroundings of the wearable device 104. In accordance with an embodiment, the 360-degree camera may further include a plurality of image sensors (not shown) to capture the 360-degree view of the surroundings of the wearable device 104 to capture the first plurality of poses, and generate the first plurality of signals corresponding to the first plurality of poses.

The server 106 may include suitable logic, circuitry, interfaces and/or code that may be configured to store information associated with the predefined model. For example, the information associated with the predefined model on the server 106 may be applied on the first set of signals of the first plurality of signals for each of the first plurality of poses. The server 106 may be further configured to communicate to the electronic apparatus 102 (through the communication network 112) a result of the application of the predefined model on the first set of signals of the first plurality of signals. Based on the application of the predefined model on the first set of signals for each of the first plurality of poses, the server 106 may be configured to determine arrow direction information for the database. Details of the arrow direction information are further described, for example, in FIG. 5.

In an embodiment, the information associated with the predefined model may include a first algorithm and a second algorithm. The first algorithm may be applied on the first set of signals of the first plurality of signals to determine joint angle data for the robotic manipulator 110 to perform the task. In an embodiment, the first algorithm may be an inverse-kinematics algorithm that may be applied on the first set of signals of the first plurality of signals to determine the joint angle data for the robotic manipulator 110 to perform the task. For example, the inverse-kinematics algorithm may include a mathematical formulation (such as an iterative Newton-Raphson method or gradient-based optimization) that may be applied on the one or more positional and orientational coordinates associated with the first set of signals to determine the joint angle data for the robotic manipulator 110. Thus, based on the first of signals associated with the first plurality of poses of at least one part of the wearable device 104, the joint angle data may be determined for the robotic manipulator 110. Although the inverse-kinematics algorithm is a straight-forward deterministic method (such as the mathematical formulation to determine the joint angle data), the determined joint angle data may be specific to the number of joints or the structure associated with the robotic manipulator 110. In order to convert the joint angle data to be invariant from the number of joints or the structure associated with the robotic manipulator 110, the second algorithm may be applied on the joint angle data.

The second algorithm may be applied on the joint angle data to determine that arrow direction information that may relate to the joint angle information for the robotic manipulator 110 to perform the task. In one example, the joint angle information may be a directional constraint that may be applied for each of the at least one effector of the robotic manipulator 110. Based on such directional constraint for each of the at least one effector of the robotic manipulator 110, the robotic manipulator 110 may avoid redundant degree-of-freedom (such as kinematic redundancy). In an embodiment, the second algorithm may be a Bayesian Interaction Primitive (BIP) that may be applied on the joint angle data to determine the arrow direction information. For example, the Bayesian Interaction Primitive (BIP) may include a statistical formulation (such as a conditional probability) that may be applied on the joint angle data to determine the arrow direction information. The determined arrow direction information may be invariant from the number of joints or the structure associated with the robotic manipulator 110. Thus, the determined arrow direction information may be provided to any robotic manipulator irrespective of the number of joints or the structure associated with such robotic manipulator.

It may be noted that the Bayesian Interaction Primitive (BIP) may be presented merely as an example of a statistical model. The present disclosure may be also applicable to other types of statistical model, such as, but not limited to, a Look-up table Model, a Learning from Demonstration Model (LfD Model), a Hidden Markov Model (HMMs), a Gaussian Mixture Model (GMMs), and the like. The description of other types of statistical model has been omitted from the disclosure for the sake of brevity.

In another embodiment, the second algorithm may include a recurrent neural network (RNN) that may be configured to convert the joint angle data to the arrow direction information based on the application of artificial neural network on the joint angle data, which may be generated from the first algorithm. It may be noted that the Recurrent Neural Network (RNN) is presented merely as an example of the artificial neural network. The present disclosure may be also applicable to other types of artificial neural networks, such as, but not limited to, a Convolutional Neural Network (CNN), a Modular Neural Network, a Radial Basis Function Neural Network, a Feed-Forward Neural Network, and the like. The description of other types of the artificial neural network has been omitted from the disclosure for the sake of brevity.

In yet another embodiment, the second algorithm may include an artificially intelligent algorithm other than the recurrent neural network that may be configured to convert the joint angle data to the arrow direction information based on the application of such artificial neural network algorithm on the joint angle data. Examples of the artificially intelligent algorithm may include, but not limited to, a machine learning algorithm and a deep learning algorithm. In another embodiment, the second algorithm may deploy a plurality of learning techniques to convert the joint angle data to the arrow direction information. Examples of the learning techniques may include, but not limited to, a supervised learning technique, an unsupervised learning technique, an ensemble learning technique, or a fuzzy logic learning technique.

In yet another embodiment, the second algorithm may include electronic data, such as, for example, a software program, code of the software program, libraries, applications, scripts, or other logic or instructions for execution by a processing device, such as the circuitry 202. The second algorithm may include code and routines configured to enable a computing device, such as the circuitry 202 to perform one or more operations for classification of one or more inputs into the arrow direction information. Additionally or alternatively, the second algorithm may be implemented using hardware including a processor, a microprocessor (e.g., to perform or control performance of one or more operations), a field-programmable gate array (FPGA), or an application-specific integrated circuit (ASIC). Alternatively, in some embodiments, the second algorithm may be implemented using a combination of hardware and software.

In yet another embodiment, the second algorithm may be a computational network or a system of artificial neurons, arranged in a plurality of layers, as nodes. The plurality of layers of the second algorithm may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the second algorithm. Outputs of each hidden layer may be coupled to inputs of at least one node in other layers of the second algorithm. Node(s) in the final layer may receive inputs from at least one hidden layer to output a result.

In yet another embodiment, the second algorithm may be trained based on a stochastic model (such as the artificial neural network). The training may include one or more parameters of each node of a network associated with the second algorithm may be updated based on whether an output of the final layer for a given input matches a correct result based on a loss function for the second algorithm. The above process may be repeated for same or a different input till a minimal of loss function may be achieved and a training error may be minimized. Several methods for training are known in art, for example, gradient descent, stochastic gradient descent, batch gradient descent, gradient boost, meta-heuristics, and the like.

In an embodiment, the server 106 may be implemented as a cloud server, which may be utilized to execute various operations (such as application of the first algorithm and the second algorithm) through web applications, cloud applications, HTTP requests, repository operations, file transfer, and the like. Examples of the server 106 may include, but are not limited to, a database server, an event server, a file server, a web server, a media server, a content server, an application server, a mainframe server, or a combination thereof. In one or more embodiments, the server 106 may be implemented as a plurality of distributed cloud-based resources. In another embodiment, the server 106 may be a computing device, which may include, but not limited to, a mainframe machine, a computer work-station, and the like. In yet another embodiment, the server 106 may be a handheld or a portable device. In such case, the examples of the server 106 may include, but are not limited to, a smartphone, a cellular phone, a mobile phone, and/or any electronic device with data processing and networking capabilities. In another embodiment, the server 106 may be an integral part of the electronic apparatus 102. The information associated with the predefined model may be directly stored in the electronic apparatus 102 and may be applied on the first set of signals of the first plurality of signals. Details of the integration of the predefined model in the electronic apparatus 102 is further described, for example in FIG. 2.

The handheld device 108 may include suitable logic, circuitry, and/or interfaces that may be configured to generate a second plurality of signals from the second plurality of sensors 108A associated with or position on the handheld device 108. In some embodiments, the handheld device 108 may include a communication interface (not shown) or a processor (not shown) to communicate (for example, the generated second plurality of signals) to the electronic apparatus 102, through the communication network 112. In an embodiment, the second plurality of signals may correspond to each of a second plurality of poses performed by the user 114 for the task using the handheld device 108, to further control (or teleoperate) the robotic manipulator 110. For example, the handheld device 108 may be held by the user 114 and may generate the second plurality of signals based on the second plurality of poses of the user 114. In an embodiment, the second plurality of poses of the user 114 performed using the handheld device 108, may correspond to the task to be performed by the robotic manipulator 110 based on control instructions provided by the electronic apparatus 102. In an embodiment, the handheld device 108 may be include a monetary value (i.e. cost) that may be lower than a monetary value of the wearable device 104. Thus, the handheld device 108 may be cost-effective compared to the wearable device 104. Examples of the handheld device 108 may include, but not limited to, Virtual-Reality (VR) device, a headgear, a glove, and the like. Details of the VR device, the headgear, and the glove are further described, for example, in FIG. 7.

The second plurality of sensors 108A associated with the handheld device 108 may include suitable logic, circuitry, interfaces and/or code, that may be configured to generate the second plurality of signals based the second plurality of poses of the user 114 performed using the handheld device 108. For example, the second plurality of sensors 108A may be communicatively coupled with the handheld device 108, via a wired or wireless connection (not shown), and may further generate the second plurality of signals based on the second plurality of poses of the user 114 performed using the handheld device 108. The second plurality of signals may include a third set of signals and a fourth set of signals. The third set of signals may correspond to one or more positional and orientational coordinates of at least one part of the handheld device 108. The at least one part of the handheld device 108 may relate to at least one effector of the handheld device 108. Details of the at least one part of the handheld device 108 are further described, for example, in FIG. 7. The fourth set of signals may correspond to object information which indicates at least one of: a grasp force, a head pose, or an object pose, for each of the second plurality of poses performed for the task using the handheld device 108. Details of the object information are further described, for example, in FIG. 7.

The second plurality of sensors 108A may detect each pose of the second plurality of poses of the user 114 performed using the handheld device 108, to generate the third set of signals and the fourth set of signals of the second plurality of signals. The second plurality of sensors 108A may detect at least one of: motion information or force information associated with the at least one part of handheld device 108 for each of the second plurality of poses performed for the task to generate the second plurality of signals. Upon generation of the second plurality of signals, the second plurality of sensors 108A or the handheld device 108 may further transmit the second plurality of signals, indicating at least one of: the detected motion information or the force information, to the electronic apparatus 102 to retrieve (or infer) the output information stored in the database for further extraction of the arrow direction information. Examples of the second plurality of sensors 108A may include at least one of, a motion sensor, a force sensor, an optical sensor, and the like.

The motion sensor of the second plurality of sensors 108A may include suitable logic, circuitry, and/or interfaces that may be configured to detect motion information including the one or more positional and orientational coordinates, associated with the at least one part of the handheld device 108, for each of the second plurality of poses performed for the task. For example, the motion information may include at least one of, an angular rate or an angular orientation that may act on the motion sensor during a movement (such as a third set of poses of the second plurality of poses) of the user 114 performed using the at least one part of the handheld device 108. For example, the at least one part of the handheld device 108 may relate to at least one effector of the handheld device 108 that may perform the third set of poses of the second plurality of poses. The motion sensor may generate the third set of signals that may correspond to the one or more positional and orientational coordinates of the third set of poses of the at least one effector of the handheld device 108. Examples of the motion sensor may include, but not limited to, an infrared sensor, an ultrasonic sensor, a microwave sensor, a tomographic sensor, a Passive Infra-Red (PIR) sensor, a camera, and the like.

The force sensor of the second plurality of sensors 108A may include suitable logic, circuitry, and/or interfaces that may be configured to detect force information associated with the at least one part of the handheld device 108 for each of the second plurality of poses performed for the task. For example, the force information may include at least one of, a tensile force, a compression force, a stress, a strain, or a change in pressure that may act on the force sensor during a movement (such as a fourth set of poses of the second plurality of poses) of the user 114 performed using the at least one part of the handheld device 108. For example, the at least one part of the handheld device 108 may relate to the at least one effector of the handheld device 108 that may perform the fourth set of poses of the second plurality of poses. The force sensor may generate the fourth set of signals that may correspond to the object information, which includes at least one of, the grasp force, the head pose, or the object pose force corresponding to the fourth set of poses of at least one part (such as the headgear, or the glove) of the handheld device 108. Examples of the force sensor of the second plurality of sensors 108A may include, but not limited to, a Load Cell, a Strain Gage, a Force Sensing Resistor (such as a piezo-resistive force sensor), and the like.

The optical sensor of the second plurality of sensors 108A may include suitable logic, circuitry, and/or interfaces that may be configured to detect optical motion information comprising the one or more positional and orientational coordinates, associated with the at least one part of the handheld device 108, for each of the second plurality of poses performed for the task. For example, the optical sensor may include an illuminator and a detector. The illuminator may illuminate a light beam on the handheld device 108. The detector may be configured to detect a change in the light beam and may generate electric signals corresponding to the change in the light beam to generate the optical motion information. The generated optical motion information may relate to the positional and orientational coordinates of the third set of poses of the second plurality of poses performed for the task. In an embodiment, the generated optical motion information may also relate to the object information that may be associated with the fourth set of poses of the second plurality of poses. Examples of the optical sensor of the second plurality of sensors 108A may include, but not limited to, a photoconductive sensor, a photovoltaic sensor, a photodiode sensor, a phototransistor, and the like.

The robotic manipulator 110 may include suitable structure, circuitry, and/or interfaces, that may be configured to execute the task (for example pick and place an object) for which control instructions are provided from the electronic apparatus 102. The robotic manipulator 110 may be made of at least one effector (such as an arm) that may be configured to execute the task. In an embodiment, the robotic manipulator 110 may have an anthropomorphic structure (such as a humanoid form), with a shoulder clavicle and at least one elbow. The robotic manipulator 110 may be constructed in such a way that the robotic manipulator 110 may mimic the movement of the user 114 in real-time (using the handheld device 108). For example, the robotic manipulator 110 may include at least one rotary actuator to mimic the movement of the user 114. Examples of the at least one rotary actuator may include, but not limited to, an electric actuator, a pneumatic actuator, a hydraulic actuator, a piezoelectric actuator, or an ultrasonic actuator. In order to mimic the movement of the user 114, the at least one rotary actuator may require the control instructions associated with the movement of the user 114. For example, the robotic manipulator 110 may receive the control instructions from the handheld device 108 directly or from the electronic apparatus 102 (including the database). In an embodiment, the robotic manipulator 110 may also receive the control instructions (such as the arrow direction information) from the constructed database, via the electronic apparatus 102, in addition to the control instructions (such as positional and orientational coordinates) from the handheld device 108. Examples of the robotic manipulator 110 may include, but not limited to, an open-loop manipulator, a parallel manipulator, or a hybrid manipulator. Details of the operations and control of the robotic manipulator 110 are further described, for example, in FIGS. 8 and 9. In an embodiment, the robotic manipulator 110 may include the electronic controller 110A to communicate with the electronic apparatus 102.

The electronic controller 110A may include suitable logic, circuitry, interfaces, and/or code that may be configured to communicate with the electronic apparatus 102, via the communication network 112. The electronic controller 110A may be a specialized electronic circuitry that may include an electronic control unit (ECU) processor to control different functions, such as, but not limited to, movement operations, communication operations, and data acquisition for the robotic manipulator 110. The electronic controller 110A may control the robotic manipulator 110 to execute the task (such as the pick and place task). The electronic controller 110A may be configured to control a linear movement or an angular movement of the robotic manipulator 110 based on the control instructions received from the electronic apparatus 102. The electronic controller 110A may be a microprocessor. Other examples of the electronic controller 110A may include, but are not limited to, an embedded device, a human-machine interface (HMI), a computer workstation, a handheld computer, a cellular/mobile phone, a portable consumer electronic (CE) device, a server, and other computing devices, which may communicate with the robotic manipulator 110 to execute the task.

The communication network 112 may include a communication medium through which the electronic apparatus 102, the wearable device 104, the server 106, the handheld device 108, and the robotic manipulator 110 may communicate with each other. The communication network 112 may be one of a wired connection or a wireless connection. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic apparatus 102 may receive inputs to construct a database (based on task performed using the wearable device 104), and further control the robotic manipulator 110 based on the task performed by the handheld device 108 and the constructed database. For the construction of the database, the electronic apparatus 102 may receive the first plurality of signals from the first plurality of sensors 104A associated with the wearable device 104. The first plurality of signals may correspond to each of the first plurality of poses performed for the task using the wearable device 104. In an embodiment, the first plurality of sensors 104A may generate the first plurality of signals based on the first plurality of poses performed for the task by the user 114 using the wearable device 104. The first plurality of sensors 104A may further transmit the generated first plurality of signals to the electronic apparatus 102. The first plurality of signals are further described, for example, in FIGS. 3A-3B, 4, and 5. Based on the receipt of the first plurality of signals, the electronic apparatus 102 may apply the predefined model on the first set of signals of the first plurality of signals for each of the first plurality of poses performed using the wearable device 104. The first set of signals may correspond to one or more positional and orientational coordinates of the at least one part (such as the at least one effector) of the wearable device 104. For example, the electronic apparatus 102 may receive the predefined model from the server 106 and apply on the first set of signals of the first plurality of signals for each of the first plurality of poses. In other example, the electronic apparatus 102 may apply the predefined model that may be stored or integrated in the electronic apparatus. Details of the application of the predefined model are further described, in example, in FIG. 5.

In an embodiment, the predefined model may include the first algorithm (such as the inverse-kinematics algorithm) and the second algorithm (such as the Bayesian interaction primitive). The first algorithm may be applied on the first set of signals of the first plurality of signals to determine the joint angle data for the robotic manipulator 110 to perform the task. The second algorithm may be applied on the joint angle data to determine the arrow direction information that may relate to the joint angle information for the robotic manipulator 110 to perform the task. The electronic apparatus 102 may further determine the arrow direction information based on the application of the predefined model (such as the first algorithm and the second algorithm) on the first set of signals for each of the first plurality of poses. The arrow direction information may relate to the joint angle information for the robotic manipulator to perform the task. Details of the arrow direction information are further provided, for example, in FIGS. 5 and 6. The electronic apparatus 102 may be further configured to aggregate the determined arrow direction information with information about the first set of signals to generate output information for each of the first plurality of poses. For example, the electronic apparatus may combine the determined arrow direction information with the first set of signals (such as the positional and orientational coordinates) of the wearable device 104 to generate the output information. Upon generation of the output information, the electronic apparatus 102 may further store the generated output information to construct the database for each of the first plurality of poses performed for the task using the wearable device 104.

For the control of the robotic manipulator 110 during runtime, the electronic apparatus 102 may receive the second plurality of signals from the second plurality of sensors 108A associated with the handheld device 108. In an embodiment, the second plurality of signals may correspond to each of the second plurality of poses performed for the task (such as the pick and place task) using the handheld device 108. Details about the reception of the second plurality of signals are further described, for example, in FIG. 7. The electronic apparatus 102 may further retrieve the stored output information corresponding to the third set of signals of the received second plurality of signals for each of the second plurality of poses. In an embodiment, the third set of signals may correspond to one or more positional and orientational coordinates of at least one part of the handheld device 108. Details about the retrieval of the stored output information corresponding to the third set of signals, are further described, for example in FIG. 8. The electronic apparatus 102 may further extract the arrow direction information from the retrieved output information for each of the second plurality of poses of the handheld device 108. Details of the extraction of the arrow direction information are further described, for example in FIG. 8. The electronic apparatus 102 may further transmit control instructions to the robotic manipulator 110 to execute the task (such as the pick and place task) based on the extracted arrow direction information and the received second plurality of signals for each of the second plurality of poses performed for the task using the handheld device 108. Details of the control instructions for the robotic manipulator 110 are further described, for example in FIGS. 8 and 9.

Figure 2:
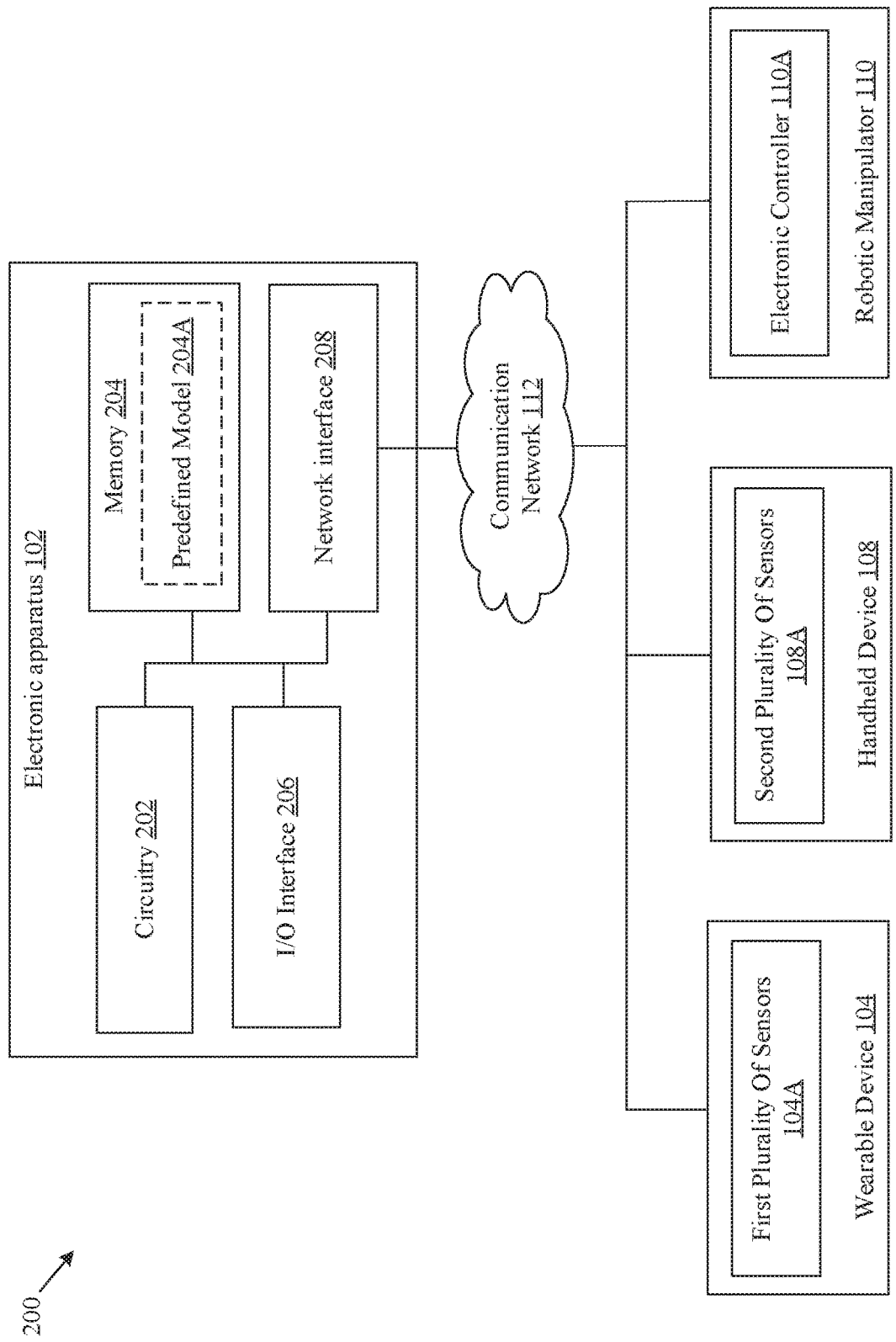
FIG. 2 is a block diagram that illustrates an exemplary electronic apparatus for a construction of a database to control a robotic manipulator, in accordance with an embodiment of the disclosure.

FIG. 2 is a block diagram that illustrates an exemplary electronic apparatus for a construction of a database to control a robotic manipulator, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, a I/O device 206, and a network interface 208. The circuitry 202 may be coupled to the memory 204, the I/O device 206, and the network interface 208, through wired or wireless connections of the communication network 112. In an embodiment, the memory 204 may be configured to store information associated with a predefined model 204A. The functions of the information associated with the predefined model 204A stored in the memory 204 may be same as the functions of the information associated with the predefined model stored in the server 106 described, for example, in FIG. 1. The electronic apparatus 102 may be configured to communicate between the wearable device 104, the handheld device 108, and the robotic manipulator 110, through the communication network 112.

The circuitry 202 may include suitable logic, circuitry, and/or interfaces that may be configured to execute program instructions associated with different operations to be executed by the electronic apparatus 102. For example, some of the operations may include, but are not limited to, reception of the first plurality of signals from the first plurality of sensors 104A associated with the wearable device 104, application of the predefined model on the first set of signals of the first plurality of signals for each of the first plurality of poses, determination of the arrow direction information based on the application of the predefined model on the first set of signals, aggregation of the determined arrow direction information with information about the first set of signals to generate output information, and control of the memory 204 (as the database) to store the generated output information for each of the first plurality of poses performed for the task using the wearable device 104. The execution of such operations is further explained, for example, in FIG. 5. In another example, some of the operations may further include, but are not limited to, reception of the second plurality of signals from the second plurality of sensors 108A associated with handheld device 108, retrieval of the stored output information corresponding to the third set of signals of the received second plurality of signals for each of the second plurality of poses, extraction of the arrow direction information from the retrieved output information for each of the second plurality of poses, and transmission of the control instructions to the robotic manipulator 110 to execute the task based on the extracted arrow direction information and the received second plurality of signals for each of the second plurality of poses performed for the task using the handheld device 108. The execution of such operations is further explained, for example, in FIG. 8.

The circuitry 202 may include any suitable special-purpose or general-purpose computer, computing entity, or processing device including various computer hardware or software modules and may be configured to execute instructions stored on any applicable computer-readable storage media (for example the memory 204). The circuitry 202 may be implemented based on a number of processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform any number of operations of the electronic apparatus 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the information associated with the task of the robotic manipulator 110. For example, in case of the pick and place task, the information may include instructions to perform the task, such as, but not limited to, grasp the object, pick the object from the starting point, carry the object towards the destination point, and place the object at the destination point. The memory 204 may be further configured to store at least one of: the motion information, the force information, or the object information associated with the task. Details of the motion information, the force information, and the object information are further described, for example in FIGS. 4 and 7. The memory 204 may be further configured to store the predefined model. For example, the memory 204 may be configured to store the first algorithm (such as the inverse kinematics algorithm) and the second algorithm (such as the Bayesian Interaction Primitive (BIP)) for the electronic apparatus 102 to determine the arrow direction information. The memory 204 may be further configured to store the output information to form the constructed database that may be generated from the electronic apparatus 102 based on the determined arrow direction information. In an embodiment, the memory 204 may also be configured to store output information associated with each pose of different tasks (such as a task other than pick and place task). Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive user inputs and generate outputs in response to the received user inputs. The I/O device 206 may include various input and output devices, which may be configured to communicate with the circuitry 202. Examples of the I/O device 206 may include, but are not limited to, a touch screen, a keyboard, a mouse, a joystick, a microphone, a display device, a speaker, and/or an image sensor.

The network interface 208 may include suitable logic, circuitry, and interfaces that may be configured to facilitate communication between the circuitry 202, the first plurality of sensors 104A associated with the wearable device 104, the second plurality of sensors 108A associated with the handheld device 108, and the electronic controller 110A associated with the robotic manipulator 110, via the communication network 112. The network interface 208 may be implemented by use of various known technologies to support wired or wireless communication of the electronic apparatus 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although in FIG. 2, it is shown that the electronic apparatus 102 includes the circuitry 202, the memory 204, the I/O device 206, and the network interface 208; the disclosure may not be limiting and the electronic apparatus 102 may include more or less components to perform the same or other functions of the electronic apparatus 102. Details of the other functions and the components have been omitted from the disclosure for the sake of brevity. The functions or operations executed by the electronic apparatus 102, as described in FIG. 1, may be performed by the circuitry 202 to construct the database. The construction of the database is further explained, for example, in FIGS. 3A-6.

Figure 3A:
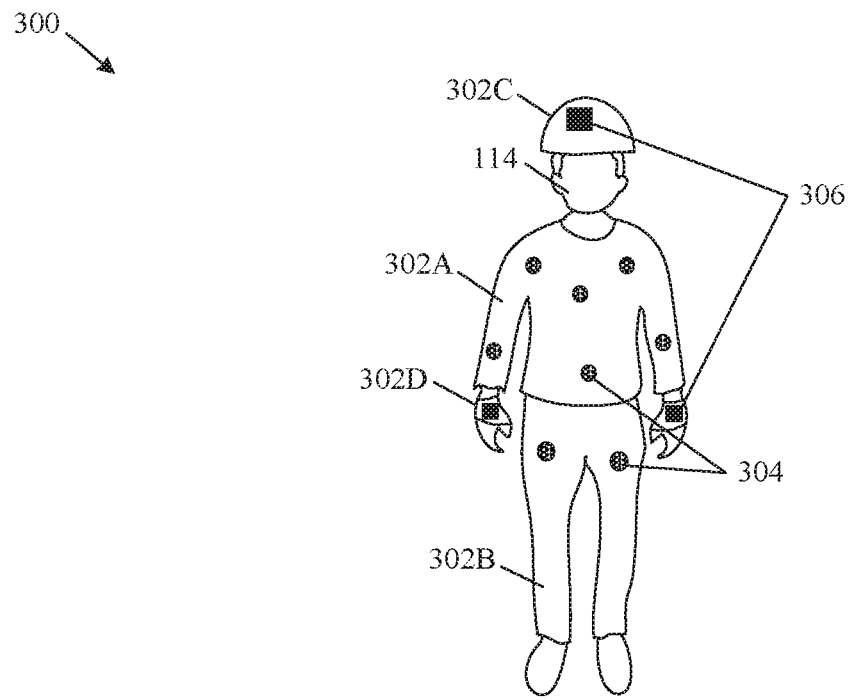
FIGS. 3A-3B are diagrams that collectively illustrate an exemplary arrangement of a wearable device that is associated with the electronic apparatus of FIG. 1, in accordance with an embodiment of the disclosure.
Figure 3B:
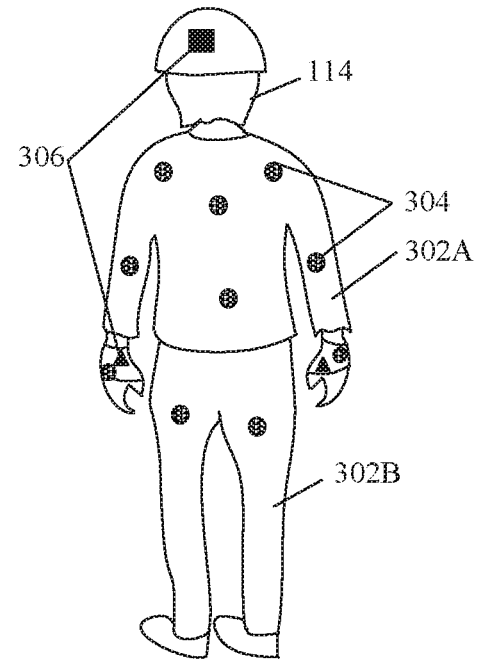

FIGS. 3A-3B are diagrams that collectively illustrate an exemplary arrangement of a wearable device that is associated with the electronic apparatus of FIG. 1, in accordance with an embodiment of the disclosure. FIGS. 3A-3B are explained in conjunction with elements from FIG. 1 and FIG. 2. FIG. 3A is a diagram that illustrates a front view of the wearable device 104. FIG. 3B is a diagram that illustrates a rear view of the wearable device 104. With reference to FIGS. 3A-3B, there is shown an exemplary arrangement 300 of the wearable device 104 that is associated with the electronic apparatus of FIG. 1. The wearable device 104 may include an upper portion 302A, a lower portion 302B, a headgear 302C, and a glove 302D. In an embodiment, the wearable device 104 may include the first plurality of sensors 104A, which may include a first set of sensors 304 and a second set of sensors 306. The first set of sensors 304 and the second set of sensors 306 may be configured to detect the first plurality of poses of the user 114 and generate the first plurality of signals. It may be noted that the user 114 and the wearable device 104 shown in FIGS. 3A-3B is merely an example. The present disclosure may be also applicable to other user such as people of different physical structure, genders, and age, without limiting the scope of the disclosure. Similarly, the present disclosure may be also applicable to other types or structure of the wearable devices or garments, without limiting the scope of the disclosure.

In an embodiment, the wearable device 104 may be the exoskeleton that may be worn by the user 114 to perform the first plurality of poses corresponding to the task. The exoskeleton may include a plurality of rigid shells forming at least one of the upper portion 302A or the lower portion 302B, which may be contoured corresponding to a structural profile (for example, a torso, or a leg) of the user 114. Examples of the exoskeleton may include, but not limited to, an upper extremity exoskeleton that may be worn on the upper portion 302A of the user 114, a lower extremity exoskeleton that may be worn on the lower portion 302B of the user 114, and the like.

In another embodiment, the wearable device 104 may be the wearable garment that may be a textile product which may be worn by the user 114. The wearable garment may be made of different combination of materials, for example textile, animal skin, or the like. In an embodiment, the wearable garment may be contoured corresponding to the structural profile (for example, a torso, or a leg) of the user 114 and form the at least one of the upper portion 302A or the lower portion 302B. Examples of the wearable garment may include, but are not limited to, a jacket, a blazer, a shirt, a trouser, an inner wear, a pant, or a combination.

In yet another embodiment, the wearable device 104 may include the headgear 302C. The headgear 302C may be communicably coupled with the wearable device 104, via wired or wireless connection (not shown). Examples of the headgear 302C may include, but are not limited to, a head mounted display (such as a virtual-reality headset, an optical head-mounted display, and the like), or a head mounted device (such as a head band, a head cap, and the like), or a helmet, and the like.

In yet another embodiment, the wearable device 104 may include the glove 302D. The glove 302D may be communicably coupled with the wearable device 104, via wired or wireless connection (not shown). The second set of sensors 306 on the glove 302D may be configured to capture the grasping force of the user 114 on an object (i.e. such as an object 406 in FIG. 4 that may be picked and placed as the task from one position to another position). In an embodiment, the glove 302D may be replaced by a portable handheld device (such as a virtual-reality device) to capture the grasping force of the user 114 on the object 406. Examples of the glove 302D may include, but not limited to, a fabric glove, a leather glove, and the like.

The first set of sensors 304 may include at least one of the IMU sensor or the optical sensor. In an embodiment, the at least one of the IMU sensor or the optical sensor may be positioned on at least one of, the upper portion 302A or the lower portion 302B of the wearable device 104. The second set of sensors 306 may include at least one of the force sensor. In an embodiment, the at least one of the force sensor may be positioned on at least one part of the wearable device 104. The details of the at least one part is explained further, for example, in FIG. 4.

It may be noted here that the positions, arrangements, or shapes of the first set of sensors 304 and the second set of sensors 306 shown in FIGS. 3A-3B is merely an example. The present disclosure may be also applicable to other positions, arrangements, shapes, or structure of first set of sensors 304 and the second set of sensors 306, without a deviation from scope of the disclosure.

Figure 4:
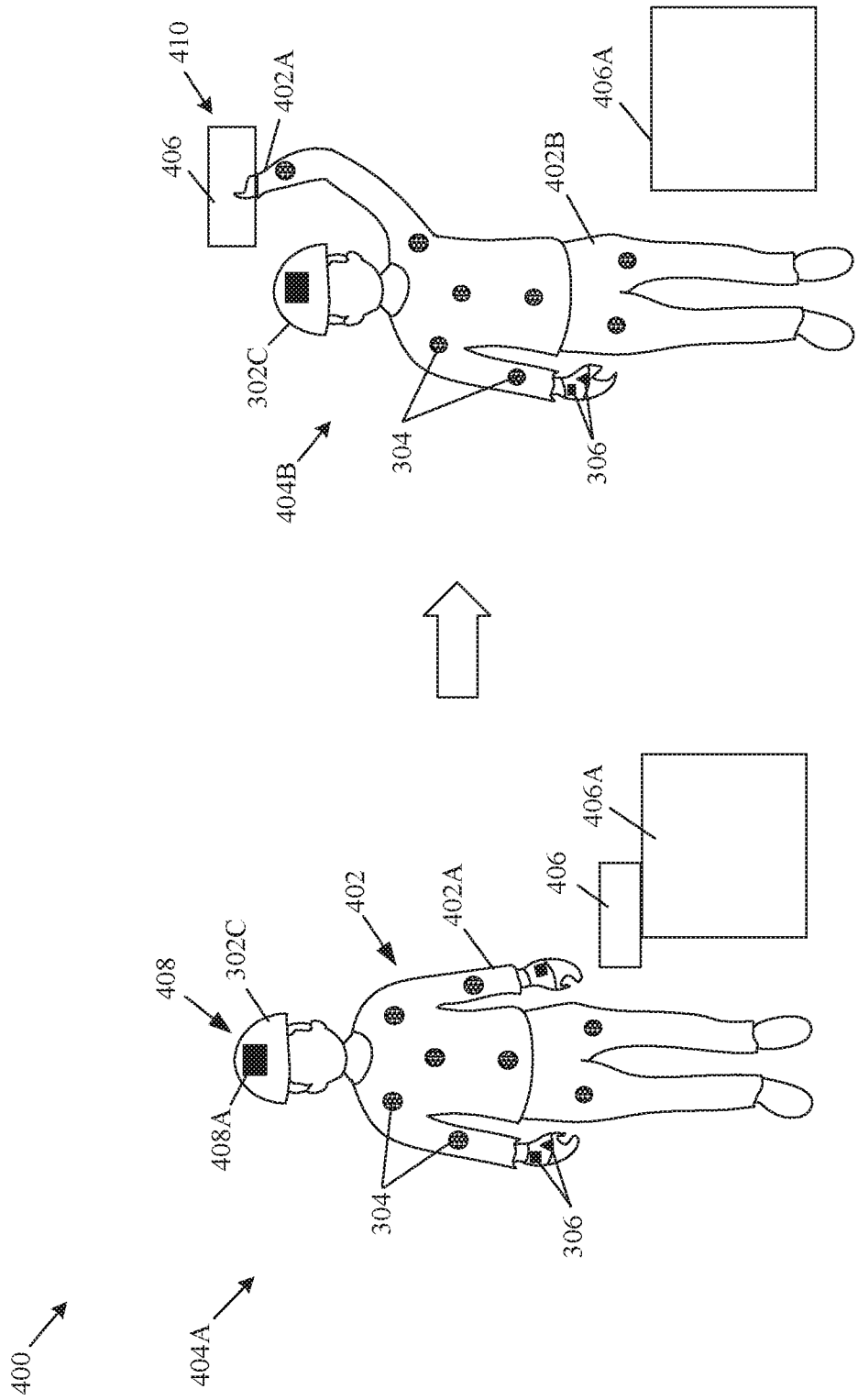
FIG. 4 is a diagram that illustrates an exemplary scenario to perform a task using a wearable device that is associated with the electronic apparatus of FIG. 1 to construct a database, in accordance with an embodiment of the disclosure.

FIG. 4 is a diagram that illustrates an exemplary scenario to perform a task using a wearable device that is associated with the electronic apparatus of FIG. 1 to construct a database, in accordance with an embodiment of the disclosure. FIG. 4 is explained in conjunction with elements from FIG. 1, FIG. 2, and FIGS. 3A-3B. With reference to FIG. 4, there is shown an exemplary scenario 400 to perform the task using the wearable device 104 that is associated with the electronic apparatus 102. The wearable device 104 may include at least one part 402 that may be configured to perform a first plurality of poses 404A-404B. In one embodiment, the at least one part 402 may relate to an arm-part of the upper portion 302A of the wearable device 104. One skilled in the art may understand that the wearable device 104 may also include two or more arm-parts to perform the task, without a deviation from scope of the disclosure. In another embodiment, the at least one part 402 may relate to a leg-part of the lower portion 302B of the wearable device 104. One skilled in the art may understand that the wearable device 104 may also include two or more leg-parts to perform the task, without a deviation from scope of the disclosure. The first plurality of poses 404A-404B may include a first pose 404A and a second pose 404B as shown in FIG. 4. In an embodiment, the first pose 404A and the second pose 404B may relate to the task (for example the pick and place task) associated with an object 406. Based on the first plurality of poses 404A-404B performed by the user 114 for the task, the first set of sensors 304 may be configured to detect the first plurality of poses and generate the first set of signals associated with the task performed using the wearable device 104. In an embodiment, the first set of signals may relate to one or more positional and orientational coordinates of the at least one part 402 associated with the wearable device 104. Further, based on the first plurality of poses 404A-404B, the second set of sensors 306 may be configured to detect the second set of signals (i.e. object information such as, but not limited to, grasp force) associated with the task performed on the object 406 using the wearable device 104.

The at least one part 402 of the wearable device 104 may be configured to perform the first plurality of poses 404A-404B for the task. In an embodiment, the at least one part 402 of the wearable device 104 may include at least one effector 402A of the wearable device 104 that performs the first set of poses of the first plurality of poses 404. In another embodiment, the wearable device 104 may further include at least one effector 402B in the lower portion 302B of the wearable device 104 that may be configured to perform the first plurality of poses 404A-404B for the task. The first set of signals (i.e. generated by the first set of sensors 304) may correspond to the one or more positional and orientational coordinates of the first set of poses of the at least one effector 402A of the wearable device 104. For example, the at least one effector may be an end effector of the wearable device 104 that may be configured to perform the first set of poses. Based on the first set of poses of the end effector of the wearable device 104, the first set of signals may be generated from the first set of sensors 304 of the first plurality of sensors 104A.

The first pose 404A may correspond to an idle pose of the wearable device 104. In the idle pose, the object 406 may be disposed on an object table 406A as shown in FIG. 4. Based on the task to be performed, the user 114 may perform the second pose 404B that may relate to picking the object 406, as shown in FIG. 4. The second pose 404B may correspond to an active pose of the wearable device 104. In the active pose, the object 406 may be picked up from the object table 406A. For example, when the second pose 404B is performed, the first set of sensors 304 associated with the first plurality of sensors 104A may generate the one or more positional and orientational coordinates of the at least one effector 402A of the wearable device 104. Simultaneously, when the second pose 404B is performed, the second set of sensors 306 associated with the first plurality of sensors 104A may generate the object information based on a movement of the at least one part 402 of the wearable device 104 or based on an applied grasp force by the at least one effector 402A of the wearable device 104 on the object 406.

The one or more positional and orientational coordinates may relate to a location of the at least one effector 402A of the wearable device 104. For example, when the user 114 performs the second pose 404B using the wearable device 104, the at least one part 402 of the wearable device 104 may be moved in six degrees-of-freedom (6-DOF) to perform the second pose 404B. The one or more positional and orientational coordinates of the at least one effector 402A related to the six degrees-of-freedom (6-DOF) may include, but not limited to, an allowability of movement of the at least one part 402 along the X-axis, Y-axis, Z-axis, a roll along the X-axis, a pitch along the Y-axis, and a yaw along the Z-axis. In an embodiment, the one or more positional and orientational coordinates of the at least one effector 402A may be measured by at least one of, the IMU sensor, or the Optical sensor, of the first set of sensors 304. In an embodiment, based on the IMU sensor, the electronic apparatus 102 may determine the inertial motion information for each pose of the first plurality of poses. The inertial motion information may include the one or more positional and orientational coordinates, associated with the at least one part of the wearable device 104, for each of the first plurality of poses performed for the task by the user 114 using the wearable device 104.

In an embodiment, the second set of signals (i.e. received from the second set of sensors 306) may relate to object information associated with the wearable device 104. The object information may include information associated with the object 406. For example, the object information may include at least one of: grasp force information, a head pose 408, or an object pose 410 associated with the task performed on the object 406 using the wearable device 104. The grasp force information may include information associated with the grasp force that may be applied by the at least one part 402 of the wearable device 104 on the object 406 to perform the task (for example, to hold the object 406). In an embodiment, the grasp force may be measured by the at least one of the force sensor in the second set of sensors 306.

The head pose 408 may indicate information associated with the headgear 302C (shown in FIG. 3A). In an embodiment, the head pose 408 may correspond to one or more positional and orientational coordinates of a head of the user 114 that may be captured by the headgear 302C, while performing the task. In an embodiment, the head pose 408 may be captured by a motion sensor 408A associated with the headgear 302C. The motion sensor 408A of the headgear 302C may include suitable logic, circuitry, and/or interfaces that may be configured to detect motion information including the one or more positional and orientational coordinates of the head of the user 114, for each of the first plurality of poses performed for the task. For example, the motion information may include at least one of, an angular rate or an angular orientation that may act on the motion sensor 408A during a movement (such as the second set of poses of the first plurality of poses) of the user 114 performed using the headgear 302C. The motion sensor 408A may generate the second set of signals that may correspond to the one or more positional and orientational coordinates of the second set of poses of the headgear 302C. Examples of the motion sensor 408A may include, but not limited to, an infrared sensor, an ultrasonic sensor, a microwave sensor, a tomographic sensor, a Passive Infra-Red (PIR) sensor, a camera, and the like.

The object pose 410 may be associated with the object 406. In an embodiment, the object pose 410 may correspond to one or more positional and orientational coordinates of the object 406, while performing the task. In an embodiment, the electronic apparatus 102 may utilize the head pose 408 to determine the object pose 410. For example, in case the object 406 is disposed on the object table 406A, an eye gaze from the user 114 may usually precede the first plurality of poses of the wearable device 104 to perform the task (such as picking the object 406). The eye gaze of the user 114 on the object 406 may be detected by the head pose 408 and the second set of signals (related to such head pose 408) may be transmitted to the electronic apparatus 102 through the headgear 302C. Thus, based on the head pose 408, the electronic apparatus 102 may determine the object pose 410 based on the received second set of signals included in the first plurality of signals. In another embodiment, the object pose 410 may also be directly measured from the force sensor associated with the second set of sensors 306.

It may be noted that, the first pose 404A and the second pose 404B shown in FIG. 4 is presented merely as an example for the first plurality of poses 404A-404B. The first plurality of poses 404A-404B may include only one pose or more than one pose to perform the task, without a deviation from scope of the disclosure. For the sake of brevity, only two poses (such as the first pose 404A and the second pose 404B) have been shown in FIG. 4. However, in some embodiments, there may be more than two poses to perform the task using the wearable device 104, without limiting the scope of the disclosure.

Figure 5:
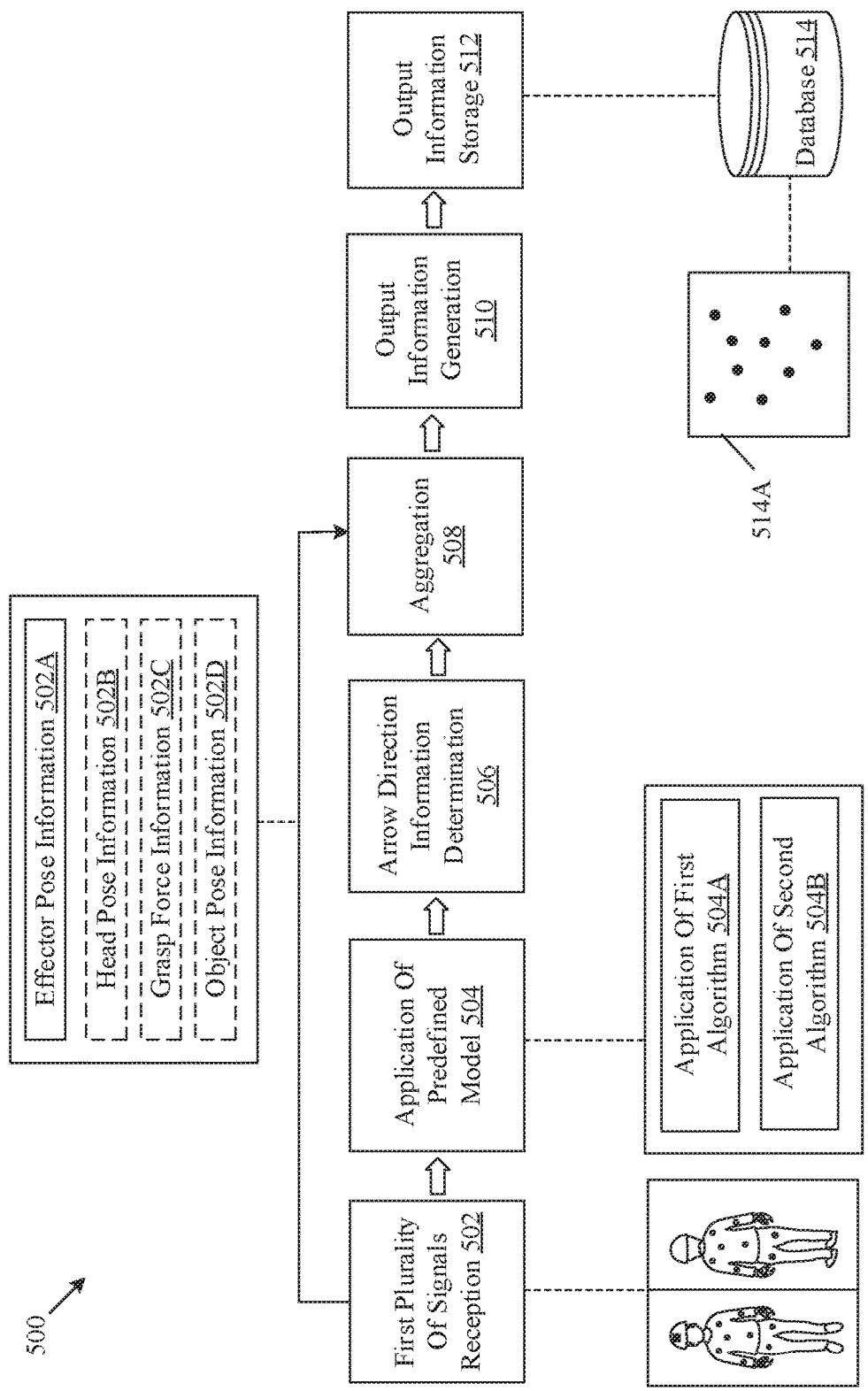
FIG. 5 is a sequence diagram that illustrates exemplary operations for construction of a database for the electronic apparatus of FIG. 1, in accordance with an embodiment of the disclosure.

FIG. 5 is a sequence diagram that illustrates exemplary operations for construction of a database by the electronic apparatus of FIG. 1, in accordance with an embodiment of the disclosure. FIG. 5 is explained in conjunction with elements from FIG. 1, FIG. 2, FIGS. 3A-3B, and FIG. 4. With reference to FIG. 5, there is shown an exemplary process flow 500 for the construction of the database by the electronic apparatus 102. In an embodiment, the operations in the exemplary process flow 500 may be handled by the electronic apparatus 102 or the circuitry 202 associated with the electronic apparatus 102.

At 502, the first plurality of signals may be received. In an embodiment, the electronic apparatus may be configured to receive the first plurality of signals from the first plurality of sensors 104A associated with the wearable device 104. The first plurality of signals may correspond to each of the first plurality of poses (such as the first plurality of poses 404A-404B shown in FIG. 4) performed for the task using the wearable device 104. The first plurality of signals may be generated with the first plurality of sensors 104A (such as the first set of sensors 304 and the second set of sensors 306 on the wearable device 104 shown in FIGS. 3A-3B and 4) for different poses performed by the user 114 for the task (for example shown in FIG. 4 to pick the object 406). For example, the first plurality of signals may correspond to at least one of effector pose information 502A, head pose information 502B, grasp force information 502C, and object pose information 502D.

The effector pose information 502A may be associated with the first set of poses of the at least one part 402 of the wearable device 104. In an embodiment, the effector pose information 502A may include the one or more positional and orientational coordinates (or pose) of the at least one effector 402A of the wearable device 104. The head pose information 502B may be associated with the head pose 408 of the user 114 wearing the headgear 302C (shown in FIG. 4). In an embodiment, the head pose information 502B may correspond to the one or more positional and orientational coordinates of the head of the user 114, that may be captured by the headgear 302, while performing the task. The grasp force information 502C may be associated with the grasp force that may be applied by the at least one part 402 of the wearable device 104 on the object 406 to perform the task (for example, the grasp force applied to hold the object 406). The object pose information 502D may be associated with the object pose 410 of the object 406. In an embodiment, the object pose 410 may correspond to the one or more positional and orientational coordinates of the object 406, while performing the task. In other words, the object pose information 502D may indicate the pose of the object 406 while performing the first plurality of poses (such as the first pose 404A and the second pose 404B shown in FIG. 4) of the task (for example picking the object 406).

At 504, the predefined model may be applied. In an embodiment, the electronic apparatus 102 may be configured to apply the predefined model on the first set of signals of the first plurality of signals for each of the first plurality of poses 404A-404B. The first set of signals may correspond to the one or more positional and orientational coordinates of the at least one effector 402A of the wearable device 104. In other words, the first set of signals may be generated by at least one of the first plurality of sensors 104A that may be configured to detect the pose (or positions and/or orientations) of the at least one part 402 of the wearable device 104. Thus, the first set of signals may correspond to the effector pose information 502A as shown in FIG. 5. In an embodiment, the predefined model may include the first algorithm and the second algorithm.

At 504A, the first algorithm may be applied. In an embodiment, the electronic apparatus 102 may be configured to apply the first algorithm on the first set of signals of the first plurality of signals to determine joint angle data for the robotic manipulator 110 (shown in FIG. 1) to perform the task. In an embodiment, the first algorithm may relate to the inverse kinematics algorithm, where the inverse kinematics algorithm may analyze the first set of signals to determine the joint angle data, for the robotic manipulator 110 to perform the task. In an embodiment, the inverse-kinematics algorithm may include a mathematical formulation (such as the iterative Newton-Raphson method or the Gradient-based optimization) that may be applied on the one or more positional and orientational coordinates associated with the first set of signals to determine the joint angle data for the robotic manipulator 110. For example, in order to apply either the iterative Newton-Raphson method or the Gradient-based optimization of the inverse kinematics algorithm, the electronic apparatus 102 may determine a Jacobian matrix associated with each of the one or more positional coordinates of the at least one effector 402A of the wearable device 104.

The Jacobian matrix (which may be denoted by a letter "J") may relate to a matrix of at least one of: a linear velocity $V_n$, and an angular velocity $\omega_n$ for each of the one or $$\text{Angular Velocity } \xi = \begin{pmatrix} \text{Linear Velocity,} & V_n \\ \text{Angular Velocity,} & \omega_n \end{pmatrix} = \begin{pmatrix} V_{xn} \\ V_{yn} \\ V_{zn} \\ \omega_{xn} \\ \omega_{yn} \\ \omega_{zn} \end{pmatrix}$$

more positional and orientational coordinates of the at least one effector 402A of the wearable device 104. The "n" may denote the number of effectors of the robotic manipulator 110. Based on the Jacobian matrix, the electronic apparatus 102 may determine an angular velocity $\xi$ for an end effector of the robotic manipulator 110. For example, a mathematical relation between the angular velocity $\xi$ for the end effector of the robotic manipulator 110 and the angular velocity $\omega_n$ for each of the one of more positional and orientational coordinates of the at least effector of the robotic manipulator is mathematically expressed as mentioned below:

From the above-mentioned mathematical expression, it may be noted that the $V_{xn}$, $V_{yn}$, and $V_{zn}$, may relate to linear velocities for the at least one effector of the robotic manipulator 110 in the X-axis, Y-axis, and Z-axis, respectively. It may be further noted that the $\omega_{xn}$, $\omega_{yn}$, and $\omega_{zn}$, may relate to angular velocities for the at least one effector of the robotic manipulator 110 in the X-axis, Y-axis, and Z-axis, respectively.

In an embodiment, the electronic apparatus 102 may further determine a joint velocity $\dot{q}$ for each of the one or more positional and orientational coordinates of the at least one effector 402A. The joint velocity $\dot{q}$ may be a vector that may describe a relative angular velocity of one segment joint to another joint. For example, the joint velocity $\dot{q}$ may be mathematically expressed as below.

$\omega_n = J\dot{q}$

From the above-mentioned mathematical expression, it may be noted that the joint velocity $\dot{q}$ may be determined based on Jacobian matrix "J" and at least one of the angular velocities (such as the $\omega_{xn}$, $\omega_{yn}$, and $\omega_{zn}$). Hence, based on the application of the inverse kinematics algorithm, the electronic apparatus may determine the joint angle data that relates to at least one of: the Joint linear velocity (such as $V_{xn}$, $V_{yn}$, and $V_{zn}$), the Joint angular velocity (such as $\omega_{xn}$, $\omega_{yn}$, and $\omega_{zn}$), or the Joint velocity $\dot{q}$, for the at least one effector of the robotic manipulator 110.

In an embodiment, the joint angle data may relate to information associated with angular orientations for each of the at least one effector of the robotic manipulator 110. In one example, the joint angle data may relate to an angular configuration for each of the at least one effector of the robotic manipulator 110. Based on such angular configuration for each of the at least one effector of the robotic manipulator 110, the robotic manipulator 110 may control the at least one effector of the robotic manipulator 110 to execute the task. In another example, the joint angle data may relate to guidance information (such as, in case of the pick and place task, a guidance to select a shortest path to reach the object 406) for each of the at least one effector of the robotic manipulator 110. Although the inverse-kinematics algorithm is a straight-forward deterministic method (such as the mathematical formulation to determine the joint angle data), the determined joint angle data may be specific to the number of joints or the structure associated with the robotic manipulator 110. In order to convert the joint angle data to be invariant from the number of joints or the structure associated with the robotic manipulator 110, the second algorithm may be applied on the joint angle data.

At 504B, the second algorithm may be applied. In an embodiment, the electronic apparatus 102 may be configured to apply the second algorithm on the joint angle data to determine the arrow direction information that relates to the joint angle information for the robotic manipulator 110 to perform the task. In an embodiment, the electronic apparatus 102 may apply the second algorithm on the joint angle data, to transform the joint angle data into the arrow direction information. In an embodiment, the second algorithm may be the Bayesian Interaction Primitive (BIP) that may be applied on the joint angle data, to model the joint angle data, and transform the joint angle data into the arrow direction information, for the robotic manipulator 110 to perform the task. For example, the Bayesian Interaction Primitive (BIP) may include a statistical formulation (such as a conditional probability) that may be applied on the joint angle data to determine the arrow direction information. The determined arrow direction information may be invariant from the number of joints or the structure associated with the robotic manipulator 110. Thus, the determined arrow direction information may be provided to any robotic manipulator irrespective of the number of joints or the structure associated with such robotic manipulator. In order to determine the arrow direction information that is invariant from the number of joints or the structure associated with the robotic manipulator 110, the electronic apparatus 102 may deploy the statistical formulation (such as a Basis Function Decomposition) associated with the Bayesian Interaction Primitive (BIP).

The Basis Function Decomposition may be a process that may involve a conversion of the joint angle data that may be in a state space (such as time-dependent data) to the arrow direction information that may be in a time-invariant latent space (such as time-independent information). For example, the electronic apparatus 102 may receive the first plurality of signals from the first plurality of sensors 104A associated with the wearable device 104 and also determine the object pose 410 based on the received head pose 408. For each of the first plurality of signals and the determined object pose 410, a value in the state space may be determined. The electronic apparatus 102 may further determine a weighted linear combination (such as a determination of weightage) for each of the value in the state space. Each of the values in the state space may be aggregated (such as grouped, or classified, or categorized, and the like) based on their weighted linear combination. The electronic apparatus 102 may further form a latent model based on the aggregated values of the state space. In the latent model, the electronic apparatus 102 may transform each of the aggregated values in the state space to each of aggregated values in the time-invariant space. The aggregation is further explained, for example, at 508 in FIG. 5.

At 506, the arrow direction information may be determined. In an embodiment, the electronic apparatus 102 may determine the arrow direction information based on the application of the predefined model on the first set of signals for each of the first plurality of poses 404A-404B performed for the task. The arrow direction information may indicate at least one additional degree-of-freedom (1-DOF) for the robotic manipulator 110 to form natural and consistent information, for the control of the robotic manipulator 110 to perform the task, even with the handheld device 108 that may be cost-effective. In an embodiment, the arrow direction information may relate to the joint angle information for the robotic manipulator 110 to perform the task. For example, based on the aggregated values in the time-invariant space of the latent model, the arrow direction information may be determined for the robotic manipulator 110. As the aggregated values are in the time-invariant space, the determined arrow direction information is invariant from the number of joints or the structure associated with the robotic manipulator 110. Thus, because of the time-invariant space of the latent model associated with the Bayesian Interaction Primitive, the electronic apparatus 102 may determine stable arrow direction information irrespective of the first plurality of poses of the wearable device 104. In an embodiment, the arrow direction information may include a vector component that may correspond to directional information of the joint angle information. For example, the directional information may include information that may guide the robotic manipulator 110. For instance, the directional information may include information to guide at least one of: the shoulder clavicle or the elbow associated with the robotic manipulator 110. Details of such directional information are further explained, for example in FIG. 6.

In accordance with an embodiment, upon determination of the arrow direction, the second algorithm (such as BIP) of the predefined model may further compute weightage information associated with the first plurality of signals, the joint angle data, the joint angle information, and the arrow direction information for each of the plurality of poses (such as the first plurality of poses 404A-404B). For example, the weightage information may relate to a weighted linear combination (such as a determination of individual weightage) for each of the first plurality of signals, the joint angle data, the joint angle information, and the arrow direction information for each of the plurality of poses (such as the first plurality of poses 404A-404B). The electronic apparatus may then utilize the weightage information to aggregate (such as to group, or to classify, or to categorize, and the like) each value in the time-invariant state of the latent model.

At 508, the determined arrow direction information may be aggregated. In an embodiment, based on the weightage information, the electronic apparatus 102 may be configured to aggregate (such as to group, or to classify, or to categorize, and the like) the determined arrow direction information with information about the first set of signals in the time-invariant state of the latent model to generate output information for each of the first plurality of poses 404. In an embodiment, the electronic apparatus 102 may be configured to aggregate the determined arrow direction information with the information about the positional and orientational coordinates of the at least one effector 402A of the first set of signals (i.e. which indicate the effector pose information 502A), to generate the output information for each of the first plurality of poses 404. In another embodiment, the electronic apparatus 102 may be further configured to aggregate the determined arrow direction information with the information about the first set of signals, and with the object information about the second set of signals, to generate the output information for each of the first plurality of poses. The object information may indicate at least one of: the head pose information 502B, the grasp force information 502C, and/or the object pose information 502D shown in FIG. 5. For example, in order to generate the output information, the electronic apparatus 102 may apply an ensemble variant (such as a Monte Carlo Ensemble) of the Bayesian Interaction Primitive (BIP) on the weightage information associated with the determined arrow direction information and the first set of signals. The Monte Carlo Ensemble may be a two-step recursive filter that may include a prediction of the weightage information associated with the determined arrow direction information and the first set of signals for the aggregation, and update of the aggregated values in the latent model based on the prediction. The electronic apparatus 102 may also apply the BIP to determine a future phase (such as a look-ahead) prediction based on the aggregated weightage information. In case of look-ahead prediction, a confidence level (such as a probability of errors) may be less. However, in such look-ahead prediction of the electronic apparatus, the electronic apparatus 102 may transmit control instructions for the robotic manipulator 110 in real-time.

At 510, the output information may be generated. In an embodiment, the electronic apparatus 102 may be configured to generate output information for each of the first plurality of poses 404A-404B. For example, the output information may be generated based on the aggregation of the arrow direction information, information associated with the first set of signals (i.e. effector pose information 502A) and the second set of signals (i.e., the object information that may indicate at least one of: the head pose information 502B, the grasp force information 502C, and/or the object pose information 502D shown in FIG. 5). For example, the output information may be an encoded data or compressed data for the combination of the arrow direction information, effector pose information 502A, and the object information that may indicate at least one of: the head pose information 502B, the grasp force information 502C, and/or the object pose information 502D.

At 512, the generated output information may be stored. In an embodiment, the electronic apparatus 102 may be configured to control the memory 204 to store the generated output information for each of the first plurality of poses 404A-404B performed for the task using the wearable device 104. In an embodiment, the stored output information may include at least one of: arm configuration information associated with the upper portion 302A of the wearable device 104, or gait configuration information associated with the lower portion 302B of the wearable device 104. The at least one of the arm configuration information or the gait configuration information may relate to the joint angle information for the robotic manipulator to perform the task. For example, the arm configuration information may include information related to each arm (such as the at least one effector 402A) in the upper portion 302A of the wearable device 104. In another example, the gait configuration information may include information related to each link (such as the at least one effector 402B) in the lower portion 302B of the wearable device 104 In accordance with an embodiment, the stored output information (as shown as 514A in FIG. 5) in the memory 204 for each of the first plurality of poses 404A-404B may form a database 514, as shown in FIG. 5. Therefore, the disclosed electronic apparatus 102 may control the memory 204 (the database 514) to store the output information (i.e. that may indicate the arrow direction information as an additional degrees-of-freedom (1-DOF) for each pose performed by the user 114 using the wearable device 104. Such additional DOF may be retrieved or inferred from the database 514 by the disclosed electronic apparatus 102, to control the robotic manipulator 110 to perform the task during the runtime, based on similar poses performed by the user 114 using the handheld device 108 (i.e. low-cost interface). Details of the retrieval of the output information from the database to control the robotic manipulator 110 are further described, for example, in FIGS. 7 and 8.

Figure 6:
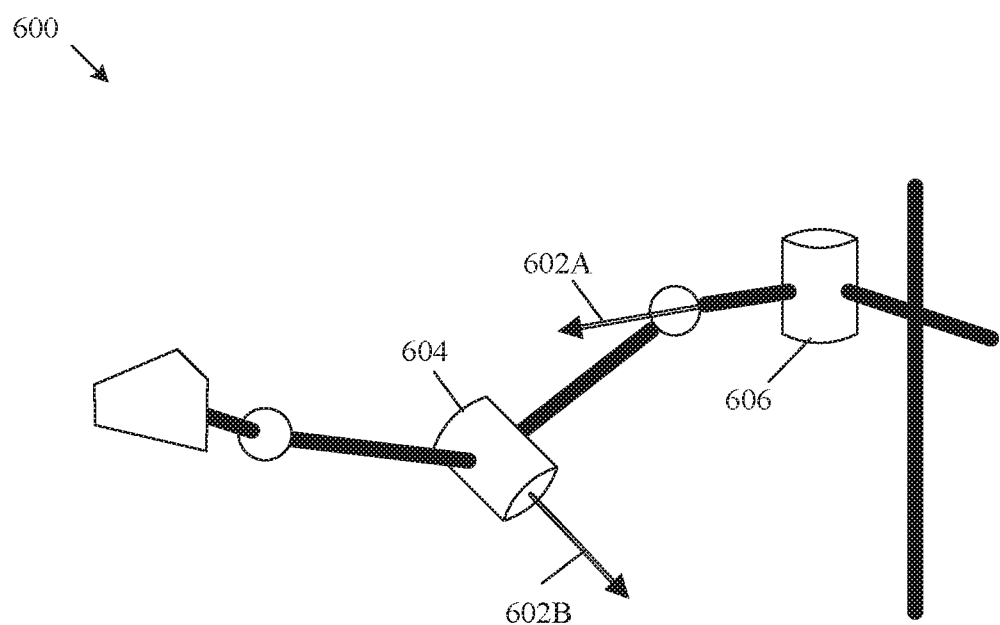
FIG. 6 is a diagram that illustrates an exemplary visualization of arrow direction information determined by the electronic apparatus of FIG. 1, in accordance with an embodiment of the disclosure.

FIG. 6 is a diagram that illustrates an exemplary visualization of arrow direction information determined by the electronic apparatus of FIG. 1, in accordance with an embodiment of the disclosure. FIG. 6 is explained in conjunction with elements from FIG. 1, FIG. 2, FIGS. 3A-3B, FIG. 4, and FIG. 5. With reference to FIG. 6, there is shown an exemplary visualization 600 of the arrow direction information included in the output information, generated for the database as described, for example, in FIG. 5. In the exemplary visualization 600, there is shown an elbow arrow direction 602A and a shoulder arrow direction 602B. The determined arrow direction information may include elbow arrow direction information and shoulder arrow direction information. The elbow arrow direction information may be associated with an elbow 604 of the robotic manipulator 110. For example, the elbow arrow direction information may indicate joint angle direction (such as the elbow arrow direction 602A) for the elbow 604 of the robotic manipulator 110 for the execution of the task for a particular pose. The shoulder arrow direction information may be associated with a shoulder clavicle 606 of the robotic manipulator 110. The shoulder arrow direction information may indicate joint angle direction (such as the shoulder arrow direction 602B) for the shoulder clavicle 606 of the robotic manipulator 110 for the execution of the task for a particular pose. Description of the angular directions or movement of the elbow 604 and the shoulder clavicle 606 are further described, for example, in FIG. 9.

Figure 7:
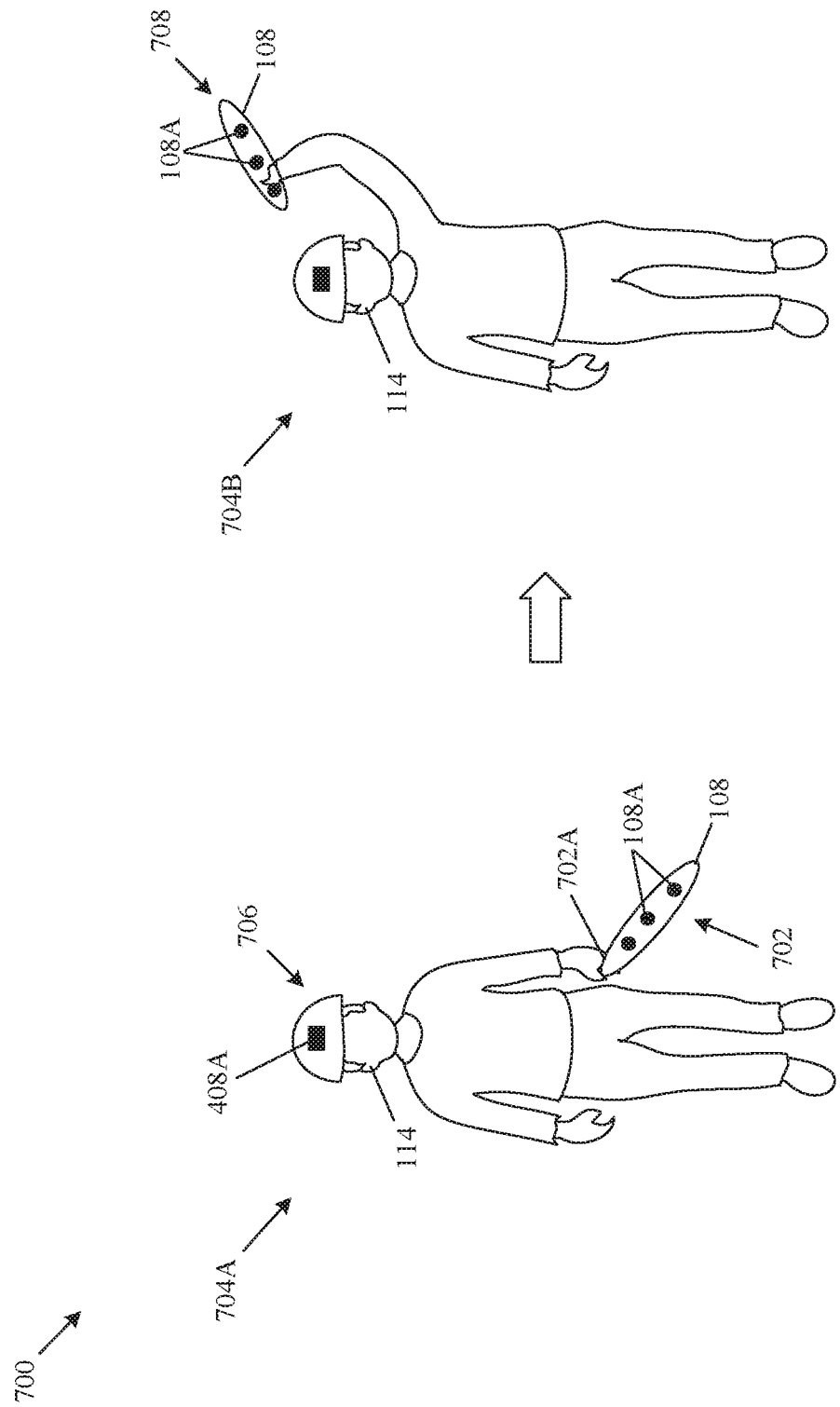
FIG. 7 is a diagram that illustrates an exemplary scenario to perform a task using a handheld device that is associated with the electronic apparatus of FIG. 1, in accordance with an embodiment of the disclosure.

FIG. 7 is a diagram that illustrates an exemplary scenario to perform a task using a handheld device that is associated with the electronic apparatus of FIG. 1, in accordance with an embodiment of the disclosure. FIG. 7 is explained in conjunction with elements from FIG. 1, FIG. 2, FIGS. 3A-3B, FIG. 4, FIG. 5, and FIG. 6. With reference to FIG. 7, there is shown an exemplary scenario 700 to perform the task using the handheld device 108 that is associated with the electronic apparatus 102. The handheld device 108 may include at least one part 702 that may be configured to perform a second plurality of poses 704A-704B. The second plurality of poses 704A-704B may include a first pose 704A and a second pose 704B as shown in FIG. 7. In an embodiment, the first pose 704A and the second pose 704B may be performed using the handheld device 108. Based on the second plurality of poses 704A-704B, the second plurality of sensors 108A may be configured to generate the second plurality of signals for each of the second plurality of poses 704A-704B performed for the task using the handheld device 108. The second plurality of signals may include a third set of signals. In an embodiment, the third set of signals may relate to one or more positional and orientational coordinates of at least one part 702 of the handheld device 108.

The at least one part 702 of the handheld device 108 may include at least one effector 702A of the handheld device 108 that performs the third set of poses of the second plurality of poses 704A-704B to generate the third set of signals. The third set of poses may be related to the at least one effector 702A and may be a sub-set of the second plurality of poses 704A-704B performed by the user 114 using the handheld device 108. The generated third set of signals may correspond to the one or more positional and orientational coordinates of the third set of poses of the at least one effector 702A of the handheld device 108. For example, the at least one effector 702A may be an end effector of the handheld device 108 that may be configured to perform the third set of poses. Based on the third set of poses of the end effector of the handheld device 108, the third set of signals may be generated from at least one the second plurality of sensors 108A.

As shown in FIG. 7, the first pose 704A may correspond to an idle pose of the handheld device 108. In the idle pose, the at least one part 702 of the handheld device 108 may be held by the user 114. Based on the predefined task, the user 114 may perform the second pose 704B, where the information about the task may be stored in the electronic apparatus 102. For example, the task may relate to picking the object 406.

The second pose 704B, shown in FIG. 7, may correspond to an active pose of the handheld device 108. In the active pose, the at least one part 702 of the handheld device 108 held by the user 114 may be moved in accordance with the second pose 704B. For example, based on the information (for example instructions) stored about the task, the user 114 may perform the second pose 704B (i.e., picking the handheld device 108 in such a way to mimic the picking task of the object 406 as shown in FIG. 4). For example, when the second pose 704B is performed, the second plurality of sensors 108A may generate the one or more positional and orientational coordinates (i.e. as the third set of signals) of the at least one effector 702A of the handheld device 108. Simultaneously, when the second pose 404B is performed, the second plurality of sensors 108A may further detect at least one of: the grasp force, the head pose, or the object pose performed for the task using the handheld device 108 based on a movement of the at least one part 702 of the handheld device 108.

The one or more positional and orientational coordinates of at least one effector 702A may relate to a location of the at least one part 702 of the handheld device 108. For example, when the user 114 performs the second pose 704B using the handheld device 108, the at least one part 702 of the handheld device 108 may be moved in six degrees-of-freedom (6-DOF) to perform the second pose 704B. The one or more positional and orientational coordinates of the at least one effector 702A related to the six degrees-of-freedom (6-DOF) may include, but not limited to, an allowability of movement of the at least one part 702 along the X-axis, Y-axis, Z-axis, a roll along the X-axis, a pitch along the Y-axis, and a yaw along the Z-axis. In an embodiment, the one or more positional and orientational coordinates of the at least one effector 702A may be measured by at least one of the Motion sensor, or the Optical sensor, of the second plurality of sensors 108A.

Further, based on the second plurality of poses 704A-704B, the second plurality of sensors 108A may be further configured to detect the fourth set of signals associated with the task performed using the handheld device 108. In an embodiment, the fourth set of signals may correspond to at least one of: a grasp force information, a head pose, or an object pose performed for the task using the handheld device 108. The grasp force information may include information associated with the grasp force that may be applied to the at least one effector 702A of the handheld device 108 to perform the task (for example, to hold the handheld device 108). In an embodiment, the grasp force may be measured by at least one of the force sensor in the second plurality of sensors 108A.

The head pose 706 may indicate information associated with the headgear 302C (shown in FIG. 3A). In an embodiment, the head pose 706 may correspond to one or more positional and orientational coordinates of the head of the user 114 that may be captured by the headgear 302C, while performing the task. In an embodiment, the head pose 706 may be captured by the motion sensor 408A associated with the headgear 302C. The motion sensor 408A may generate the fourth set of signals that may correspond to the one or more positional and orientational coordinates of the fourth set of poses of the headgear 302C.

The object pose 708 may be associated with a pose for the object 406 (as shown in FIG. 4). In an embodiment, the object pose 708 may be determined based on the head pose 706. For example, in case the object 406 is disposed on the object table 406A (as shown in FIG. 4), an eye gaze from the user 114 may usually precede the second plurality of poses of the handheld device 108 to perform the task (i.e., picking the handheld device 108 in such a way to mimic the picking task of the object 406 as shown in FIG. 4). The eye gaze of the user 114 may be detected by the head pose 706 and the fourth set of signals (related to such head pose 706) may be transmitted to the electronic apparatus 102 through the headgear 302C. Thus, based on the head pose 706, the electronic apparatus 102 may determine the object pose 708. In another embodiment, the object pose 708 may also be directly measured from the force sensor associated with the second plurality of sensors 108A.

It may be noted that, the first pose 704A and the second pose 704B shown in FIG. 7 is presented merely as an example for the second plurality of poses 704A-704B. The second plurality of poses 704A-704B may include only one pose or more than one pose to perform the task, without deviation from the scope of the disclosure. For the sake of brevity, only two poses (such as the first pose 704A and the second pose 704B) have been shown in FIG. 7. However, in some embodiments, there may be more than two poses using the handheld device 108, without limiting the scope of the disclosure.

Figure 8:
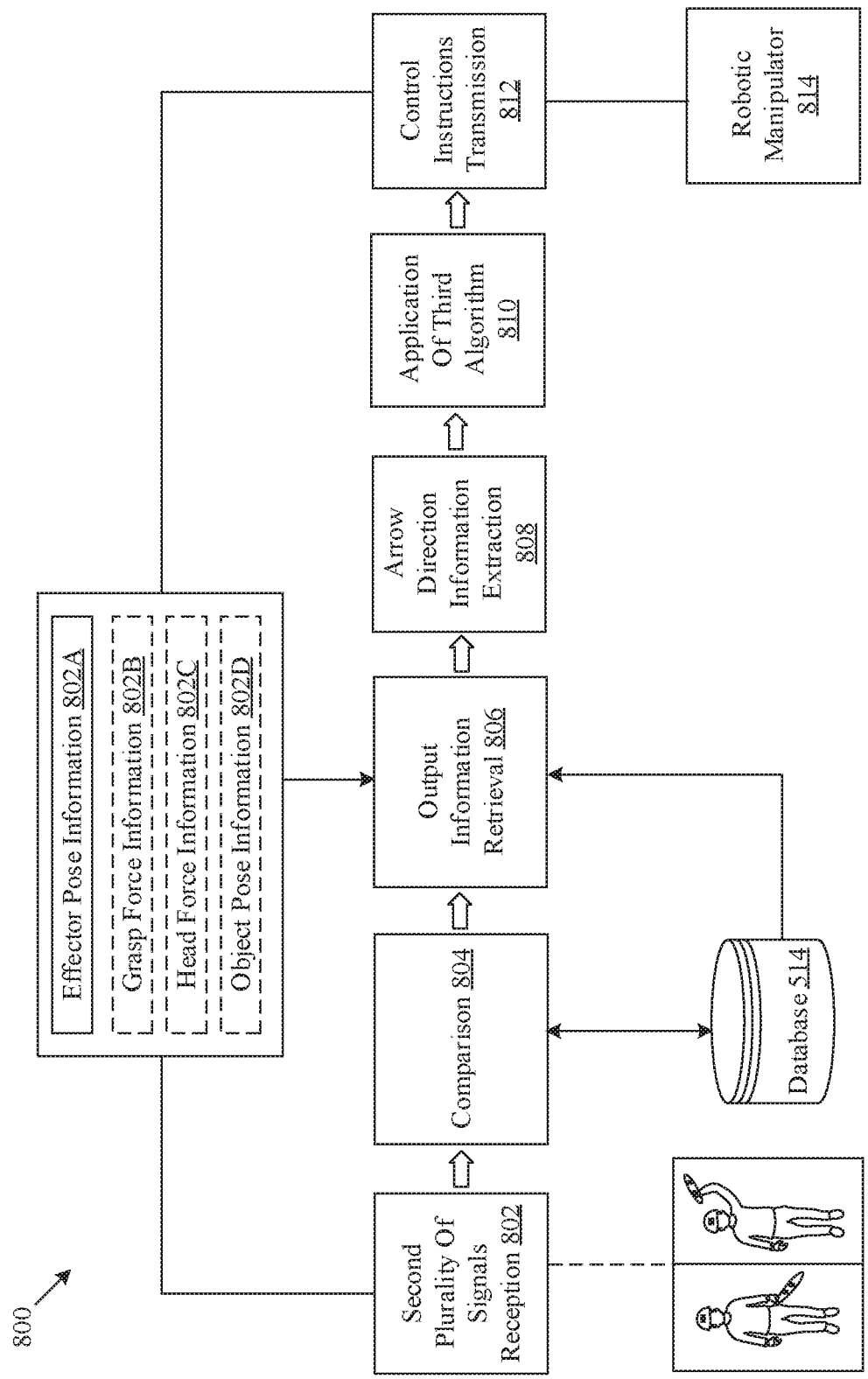
FIG. 8 is a sequence diagram that illustrates exemplary operations for a control of a robotic manipulator using a database associated with the electronic apparatus of FIG. 1, in accordance with an embodiment of the disclosure.

FIG. 8 is a sequence diagram that illustrates exemplary operations for a control of a robotic manipulator using a database associated with the electronic apparatus of FIG. 1, in accordance with an embodiment of the disclosure. FIG. 8 is explained in conjunction with elements from FIG. 1, FIG. 2, FIGS. 3A-3B, FIG. 4, FIG. 5, FIG. 6, and FIG. 7. With reference to FIG. 8, there is shown an exemplary process flow 800 for a control of the robotic manipulator 110 using the database 514 associated with or constructed by the electronic apparatus 102. In an embodiment, the operations in the exemplary process flow may be handled by the electronic apparatus 102 or the circuitry 202 associated with the electronic apparatus 102.

At 802, the second plurality of signals may be received. In an embodiment, the electronic apparatus 102 may receive the second plurality of signals from the second plurality of sensors 108A associated with the handheld device 108. The second plurality of signals may correspond to each of the second plurality of poses (such as the second plurality of poses 704A-704B) performed for the task using the handheld device 108. For example, the second plurality of signals may correspond to at least one of, effector pose information 802A, grasp force information 802B, head pose information 802C, and object pose information 802D, as shown for example, in FIG. 8.

The effector pose information 802A may be associated with the third set of poses of the at least one part 702 of the handheld device 108. In an embodiment, the effector pose information 802A may indicate, the one or more positional and orientational coordinates of the at least one effector 702A of the handheld device 108. The effector pose information 802A may be indicated by the third set of signals received from the one of the second plurality of sensors 108A of the handheld device 108.

The grasp force information 802B may include information associated with the grasp force that may be applied to the at least one effector 702A of the handheld device 108 to perform the task (for example, to hold the handheld device 108). In an embodiment, the grasp force information 802B may be measured by the at least one of the force sensor in the second plurality of sensors 108A.

The head pose information 802C may indicate information associated with the headgear 302C (shown in FIG. 3A). In an embodiment, the head pose information 802C may correspond to one or more positional and orientational coordinates of the head of the user 114 that may be captured by the headgear 302C, while performing the task. In an embodiment, the head pose information 802C may be captured by the motion sensor 408A associated with the headgear 302C. The motion sensor 408A may generate the fourth set of signals that may correspond to the one or more positional and orientational coordinates of the fourth set of poses of the headgear 302C.

The object pose information 802D may be associated with a pose for the object 406 (as shown in FIG. 4). In an embodiment, the object pose information 802D may be determined based on the head pose information 802C. For example, in case the object 406 is disposed on the object table 406A (as shown in FIG. 4), an eye gaze from the user 114 may usually precede the second plurality of poses of the handheld device 108 to perform the task (i.e., picking the handheld device 108 in such a way to mimic the picking task of the object 406 as shown in FIG. 4). The eye gaze of the user 114 may be detected by the head pose information 802C and such head pose information 802C (i.e. fourth set of signals included in the second plurality of signals) may be transmitted to the electronic apparatus 102 through the headgear 302C. Thus, based on the head pose information 802C, the electronic apparatus 102 may determine the object pose information 802D. In another embodiment, the object pose information 802D may also be directly measured from the force sensor associated with the second plurality of sensors 108A.

In an embodiment, the second plurality of sensors 108A may detect at least one of motion information or force information associated with the at least one part 702 of the handheld device 108 for each of the second plurality of poses 704A-704B performed for the task. The second plurality of sensors 108A may further transmit the second plurality of signals indicating at least one of: the motion information or the force information to the electronic apparatus 102. The detected motion information may be at least one of: the effector pose information 802A, head pose information 802C, or the object pose information 802D, of the at least one part 702 of the handheld device 108. The detected force information may be the grasp force information 802B of the at least one part 702 of the handheld device 108.

At 804, information about the third set of signals for each of the second plurality of poses 704A-704B may be compared with the output information stored in the database 514 (or the memory 204) at 512 in FIG. 5. In an embodiment, the electronic apparatus 102 may be configured to compare the information about the generated third set of signals for each of the second plurality of poses 704A-704B, with the output information stored in the memory 204 including the database 514. The output information may be related to the first set of signals for each of the first plurality of poses 404A-404B associated with the wearable device 104 and may be generated as described, for example, in FIG. 5.

In an embodiment, the information about the third set of signals may correspond to the one or more positional and orientational coordinates (i.e. effector pose information 802A) of the at least one effector 702A of the handheld device 108. The information about the third set of signals (i.e. effector pose information 802A) may be compared with the output information stored in the memory 204 and related to the first set of signals (i.e. effector pose information 502A as described, for example, at 502-508 in FIG. 5) for each of the first plurality of poses 404A-404B. In other words, the information about the third set of signals (i.e. effector pose information 802A of the at least one effector 702A of the handheld device 108) may be compared with the effector pose information 502A of the at least one effector 402A of the wearable device 104 included in the stored output information for each of the first plurality of poses 404A-404B. The inclusion of the effector pose information 502A in the output information for each of the first plurality of poses 404A-404B is described, for example, in 508 and 510 in FIG. 5. In an embodiment, the electronic apparatus 102 may retrieve the output information from the memory 204 (or the database) stored for each of the first plurality of poses 404A-404B of the task, to perform the comparison with the effector pose information 802A. In an embodiment, the electronic apparatus 102 may perform the comparison to identify whether the effector pose information 502A stored in the output information for a particular pose of the effector of the wearable device 104 matches with the effector pose information 802A of the at least one effector 702A of the handheld device 108, or not. The comparison may be performed to determine the output information stored in the memory 204 (or the database 514) for which the effector pose information 802A of the effector of the handheld device 108 matches with the effector pose information 502A of the effector of the wearable device 104. The match may further indicate that a particular or current pose performed by the effector of the handheld device 108 matches with similar pose performed by the effector of the wearable device 104 (i.e. indicated in the determined output information including the effector pose information 502A).

At 806, the output information may be retrieved based on the comparison. In an embodiment, the electronic apparatus 102 may retrieve, from the memory 204 (or the database 514), the stored output information that may be determined based on the comparison at 804 in FIG. 8. The retrieved output information from the memory 204 may indicate a match between the effector pose information 802A (of the at least one effector 702A of the handheld device 108), and the effector pose information 502A (i.e. included in the determined output information) of the effector of the wearable device 104. Thus, the retrieved output information may correspond to the third set of signals which indicate the effector pose information 802A and included in the received second plurality of signals for a particular pose of the second plurality of poses 704A-704B performed by the user 114 using the handheld device 108. Similarly, the electronic apparatus 102 may be configured to determine and retrieve the output information for each of the second plurality of poses 704A-704B based on the comparison (as described, for example, at 804). In an embodiment, the comparison (at 804) and the retrieval (at 806) of the stored output information may be referred as an inference process of the output information from the constructed database 514, based on the second plurality of signals received from the handheld device 108 (i.e. at 802 in FIG. 8).

At 808, the arrow direction information may be extracted. In an embodiment, the electronic apparatus 102 may be configured to extract the arrow direction information from the retrieved output information (i.e. determined at 804 in FIG. 8) for a particular pose of the second plurality of poses 704A-704B performed using the handheld device 108 (as described, for example, in FIG. 7). In an embodiment, the second plurality of signals received from the second plurality of sensors 108A may correspond to six degrees-of-freedom (6-DOF) of the handheld device 108 (i.e. low-cost interface). The extracted arrow direction information from the database 514 may correspond to at least one degree-of-freedom (1-DOF), which may be different from the 6-DOF of the handheld device 108. The at least one degree-of-freedom (1-DOF) indicated by the arrow direction information (i.e. extracted from the database 514) may be an additional degree-of-freedom (DOF) that may be required by the robotic manipulator 110 to perform the task, where only six degrees-of-freedom (6-DOF) poses are performed by the handheld device 108 for the task. Thus, the additional degree-of-freedom (DOF) extracted or inferred from the database 514 for a similar pose (i.e. performed by the wearable device 104) may supplement missing information (i.e. missing from 6-DOF of the handheld device 108) for the effective control of the robotic manipulator 110 (i.e. humanoid robot). The control of the robotic manipulator 110 using the handheld device 108 is further described, for example, in FIG. 9. The electronic apparatus 102 may similarly extract the arrow direction information from the retrieved output information (i.e. determined at 804 in FIG. 8) for each of the second plurality of poses 704A-704B performed using the handheld device 108 to control or teleoperate the robotic manipulator 110.

In addition to the extraction of the arrow direction information, the electronic apparatus 102 may also extract the at least one of: the grasp force information 502C, or the object pose information 502D that may be stored in the output information (i.e. retrieved at 806) of the database 514. Based on the at least one of: the grasp force information 502C or the object pose information 502D, the electronic apparatus 102 may reduce an error in extraction of the at least one additional degree-of-freedom (1-DOF) from the database 514 through the handheld device 108. Further, the extracted at least one of: the grasp force information 502C or the object pose information 502D, may also be utilized to provide effective control instructions for the robotic manipulator 110 (i.e. humanoid robot). Details of the control of the robotic manipulator 110 using the handheld device 108 are further described, for example, in FIG. 9.

At 810, a third algorithm may be applied on the extracted arrow direction information. In an embodiment, the electronic apparatus 102 may be configured to apply the third algorithm (for example, stored in the server 106 or in the memory 204), on the extracted arrow direction information to generate the control instructions for the robotic manipulator 110. For example, the third algorithm may include an inverse kinematics algorithm. The electronic apparatus 102 may be configured to apply the inverse kinematics algorithm on the extracted arrow direction information to generate the control instructions for the robotic manipulator 110. For example, the inverse kinematics algorithm may analyze the extracted arrow direction information to determine the control instructions including at least one additional degree-of-freedom (1-DOF), for the robotic manipulator 110 to perform the task. In an embodiment, the inverse-kinematics algorithm may include a mathematical formulation (such as the iterative Newton-Raphson method or the Gradient-based optimization) that may be applied on the extracted arrow direction information to determine the control instructions including at least one additional degree-of-freedom (1-DOF), for the robotic manipulator 110 to perform the task. Details of the control instructions for the robotic manipulator 110 are further described, for example in FIG. 9.

At 812, the control instructions may be transmitted to the robotic manipulator 110 to execute the task. In an embodiment, the electronic apparatus 102 may be configured to transmit the control instructions to the robotic manipulator 110 to execute the task, based on the extracted arrow direction information (i.e. at least one additional degree-of-freedom (1-DOF)) and the received second plurality of signals (i.e. six degrees-of-freedom (6-DOF)) for each of the second plurality of poses 704A-704B performed for the task using the handheld device 108. The arrow direction information (i.e. described, for example, in FIG. 6) may be extracted or inferred from the database 514 which is constructed based on the first plurality of poses 404A-404B performed for the same task using the wearable device 104, as described, in FIGS. 4 and 5.

At 814, the robotic manipulator 110 may be controlled. In an embodiment, the electronic controller 110A of the robotic manipulator 110 may be configured to control the robotic manipulator 110 based on the control instructions received from the electronic apparatus 102. Description of the control of the robotic manipulator 110 is further described, for example, in FIG. 9.

In accordance with an embodiment, as described at 804 in FIG. 8, in case of mismatch between the information about the third set of signals (i.e. effector pose information 802A of a particular pose of the effector of the handheld device 108) and the stored effector pose information 502A in the output information for each of the first plurality of poses 404A-404B performed by the effector of the wearable device 104, the electronic apparatus 102 may retrieve the output information of nearest pose match from the database 514. The mismatch between the effector pose information 802A of the particular pose of the effector of the handheld device 108 with the effector pose information 502A included in the stored output information in the database 514 may be referred as a failure of the inference process described at 804 and 806 of FIG. 8. For example, the nearest pose match may indicate nearest value of the positional and orientational coordinates of the at least one effector 402A of the wearable device 104 (i.e. mentioned by the effector pose information 502A in the stored output information in the database 514) which may match with the positional and orientational coordinates (i.e. effector pose information 802A) of the at least one effector 702A for a particular pose performed using the handheld device 108. The nearest value of the positional and orientational coordinates of the at least one effector 402A may refer to a different pose of the first plurality of poses 404A-404B in the stored database 514, which may be substantially similar to the particular pose (i.e. indicated in the third set of signals) performed by the effector of the handheld device 108. The electronic apparatus 102 may further extract the arrow direction information (as described, for example, at 808) from the output information related to the nearest value of the positional and orientational coordinates of the at least one effector 402A (i.e. effector pose information 502A) of one of the first plurality of poses 404A-404B performed by the effector of the wearable device 104.

In some embodiments, the electronic apparatus 102 may identify, from the constructed database 514, multiple nearest values of the positional and orientational coordinates of the at least one effector 402A of the wearable device 104, determine the output information, and extract the arrow direction information for each of the nearest value of the positional and orientational coordinates of the at least one effector 402A (i.e. effector pose information 502A). The determined output information and the extracted arrow direction information for each of the multiple nearest values may correspond to different poses of the effector of the wearable device 104 which may be substantially similar to the particular pose (i.e. indicated in the third set of signals) performed by the effector of the handheld device 108.

The electronic apparatus 102 may be further configured to calculate mean information (i.e. mean or average value) of the arrow direction information for the multiple nearest values (i.e. effector pose information 502A) in the retrieved output information corresponding to the different poses related to the first set of signals (i.e. which may indicate the effector pose information 502A). The electronic apparatus 102 may further apply the third algorithm on the mean information of the arrow direction information to generate the control instructions for the control of the robotic manipulator 110. Therefore, the disclosed electronic apparatus 102 may provide control instructions to the robotic manipulator 110 based on the calculation of the mean or average of the arrow direction information for the multiple nearest values of the positional and orientational coordinates of the at least one effector 402A of the wearable device 104, even though a particular or current pose of the effector of the handheld device 108 does not match with effector pose information 502A stored in the database 514 for the first plurality of poses 404A-404B of the wearable device 104.

Figure 9:
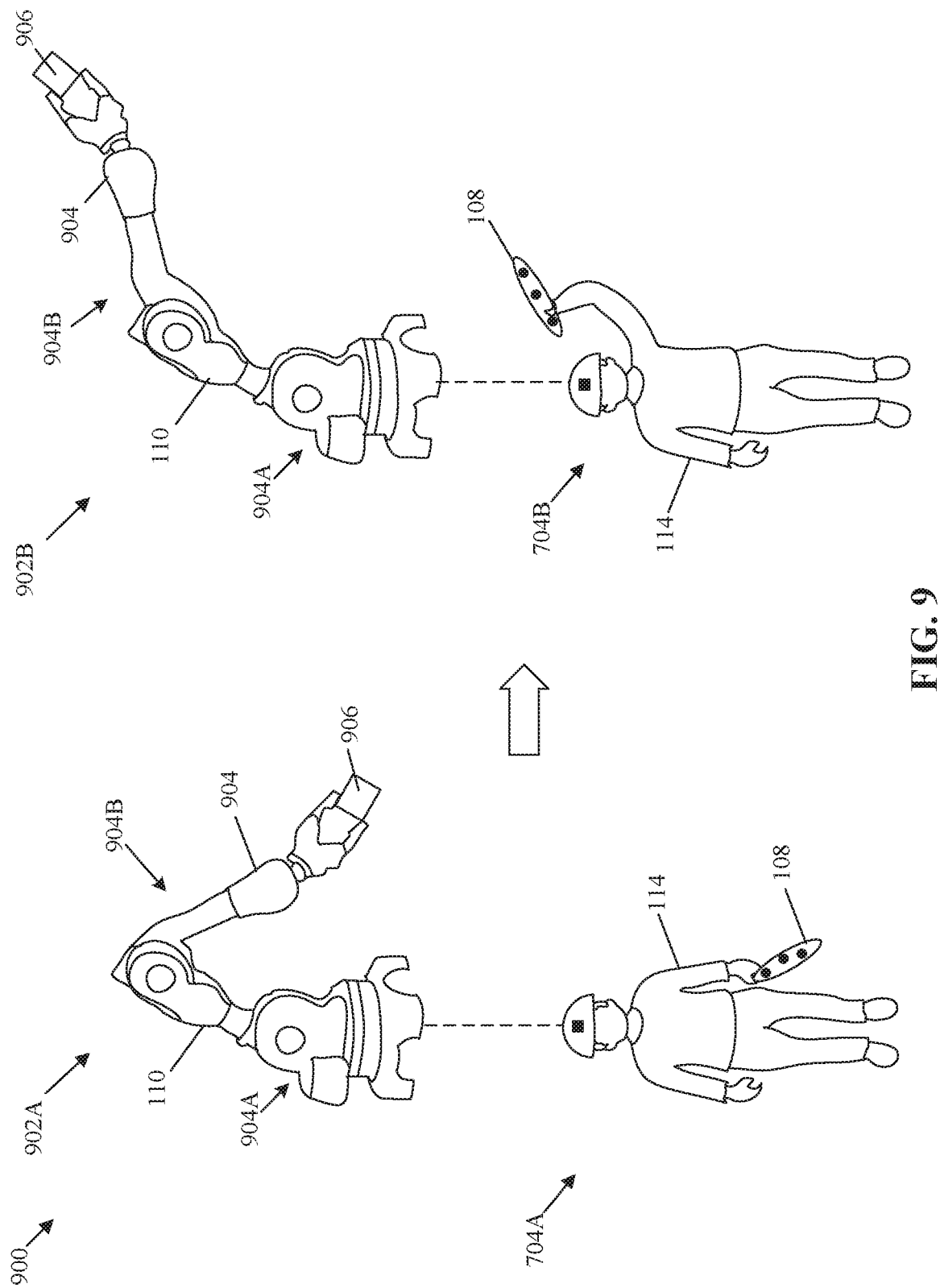
FIG. 9 is a diagram that illustrates an exemplary scenario for a control of a robotic manipulator using the electronic apparatus and the handheld device, in accordance with an embodiment of the disclosure.

FIG. 9 is a diagram that illustrates an exemplary scenario for a control of a robotic manipulator using the electronic apparatus and the handheld device, in accordance with an embodiment of the disclosure. FIG. 9 is explained in conjunction with elements from FIG. 1, FIG. 2, FIGS. 3A-3B, FIG. 4, FIG. 5, FIG. 6, FIG. 7, and FIG. 8. With reference to FIG. 9, there is shown an exemplary scenario 900 for the control of the robotic manipulator 110. The exemplary scenario 900 shows a first pose 902A and a second pose 902B for the robotic manipulator 110. In an embodiment, the first pose 902A and the second pose 902B may relate to the task associated with an object 906. For example, the task may be to pick the object 906.

The first pose 902A may correspond to an idle pose of the robotic manipulator 110. In the idle pose, the object 906 may be held by at least one effector 904 of the robotic manipulator 110. The at least one effector 904 may further include a shoulder 904A and an elbow 904B. The shoulder 904A and the elbow 904B may be kinematically coupled with each other to form the at least one effector 904. In an embodiment, the first pose 902A of the robotic manipulator 110 may be controlled based on the first pose 704A of the second plurality of poses 704A-704B of the handheld device 108 and the control instructions provided by the electronic apparatus 102 based on the first pose 704A. For example, in case the handheld device 108 is disposed at the first pose 704A (such as the idle pose of the handheld device 108), the robotic manipulator 110 may also be disposed at the first pose 902A (such as the idle pose of the robotic manipulator 110).

The second pose 902B may correspond to an active pose of the robotic manipulator 110. In the active pose, the object 906 may be moved to a location associated with the second pose 902B, by at least one effector 904 of the robotic manipulator 110. In an embodiment, the second pose 902B of the robotic manipulator 110 may be controlled based on the second pose 704B of the second plurality of poses 704A-704B of the handheld device 108 and the control instructions provided by the electronic apparatus 102 based on the second pose 704B. For example, in case the handheld device 108 is disposed at the second pose 704B (such as the active pose of the handheld device 108), the electronic apparatus 102 may receive the second plurality of signals (i.e. related to the second pose 704B) from the second plurality of sensors 108A of the handheld device 108, and may retrieve the output information corresponding to the received second pose 704B from the database 514, as described, for example, at 802-806 in FIG. 8. Further, the electronic apparatus may then apply the third algorithm (such as the inverse kinematics algorithm) to the extracted arrow direction information included in the retrieved output information to further generate the control instructions or signals for the robotic manipulator 110, as described, for example, at 808-810 in FIG. 8. The electronic apparatus 102 may further transmit the generated control instructions to control the robotic manipulator 110 based on the second pose 704B of the handheld device 108. Based on the received control instructions from the electronic apparatus 102, the electronic controller 110A (i.e. shown in FIG. 1) associated with the robotic manipulator 110, may control the robotic manipulator 110 to move the at least one effector 904 to the location associated with or similar to the second pose 902B (such as the active pose of the handheld device 108 held by the user 114). In an embodiment, the electronic apparatus 102 may transmit the control instructions to the robotic manipulator 110 in real-time without any lag in the transmission of the control instructions. For example, the control instructions may include the at least one additional degree-of-freedom (1-DOF) as the arrow direction information extracted from the constructed database 514, and further include information/signals related to the six degrees-of-freedom (6-DOF) of the handheld device 108, to control the robotic manipulator 110. In another example, the control instructions may include at least one of: the head pose information 502B, the grasp force information 502C, or the object pose information 502D extracted from the constructed database 514, along with information/signals related to the six degrees-of-freedom (6-DOF) of the handheld device 108, to control the robotic manipulator 110. In yet another example, the control instructions may include the at least one additional degree-of-freedom (1-DOF) that may be extracted from the constructed database 514 as the arrow direction information, and further include the at least one of: the grasp force information 802B, the head pose information 802C, and the object pose information 802C that may be directly received in the second plurality of signals from the handheld device 108, to control the robotic manipulator 110.

In another embodiment, the electronic apparatus 102 may receive the second plurality of signals from the second plurality of sensors 108A associated with the handheld device 108. The second plurality of signals may include the fourth set of signals as described, for example, in FIG. 1. The fourth set of signals may correspond to the object information, which may include at least one of: the grasp force, the head pose, or the object pose that may be performed for the task using the handheld device 108. In an embodiment, the electronic apparatus 102 may compare information about the fourth set of signals for each of the second plurality of poses 704A-704B, with the output information stored in the memory 204 of the database 514. The output information may relate to the second set of signals (i.e. the object information associated with the wearable device 104) for each of the first plurality of poses 404A-404B associated with the wearable device 104. For example, the electronic apparatus 102 may compare the fourth set of signals with the second set of signals stored in the memory 204 including the database 514. The four set of signals may correspond to the at least one of, the grasp force information 802B, the head pose information 802C, or the object pose information 802D, which may be compared with the object information stored in the memory 204 including the database 514.

The electronic apparatus 102 may further retrieve, from the memory 204 of the database 514, the stored output information that may correspond to the fourth set of signals for each of the second plurality of poses 704A-704B. The electronic apparatus 102 may further extract the at least one of the arrow direction information or the object information, from the retrieved output information for each of the second plurality of poses 704A-704B (i.e. similar to extraction described at 808 in FIG. 8). Based on the extracted arrow direction information or the object information, the electronic apparatus 102 may transmit the control instructions to the robotic manipulator 110 to execute the task based on the at least one of the extracted arrow direction information or the extracted object information, and based on the received second plurality of signals for each of the second plurality of poses 704A-704B performed for the task using the handheld device 108.

In accordance with an embodiment, the electronic apparatus 102 may further determine object trajectory information for the robotic manipulator 110 from the extracted object information, where the object trajectory information may be associated with the object 406 of the task. The object trajectory information may be based on at least one of: the second set of signals or the fourth set of signals, that corresponds to the task. In an embodiment, the object trajectory information may include information associated with a path of the at least one effector 904 of the robotic manipulator 110 to reach the object 406. For example, the object trajectory information may relate to a shortest path for the at least one effector 904 of the robotic manipulator 110 to reach the object 406. In another embodiment, the object trajectory information may further include information associated with a transmission path of the at least one effector 904 of the robotic manipulator 110, to execute the task. For example, in case of pick and place task, the object trajectory information may relate to information associated with at least one of: picking the object 906 from a starting point, carrying the object 906 towards a destination point, and placing the object 906 at the destination point.

In an embodiment, the electronic apparatus 102 may further determine the grasp force information 802B for the robotic manipulator 110 from the object information. The grasp force information 802B may be associated with a force required to hold the object 906 for the task. The grasp force information 802B may be based on at least one of: the second set of signals or the fourth set of signals, that corresponds to the task.

In an embodiment, the control instructions for the robotic manipulator 110 may include at least one of: arm configuration information, or gait configuration information for the robotic manipulator 110. The at least one of the arm configuration information or the gait configuration information may relate to the joint angle information for the robotic manipulator 110 to perform the task. For example, the arm configuration information may include information related to each arm (such as the shoulder 904A or the elbow 904B), for the robotic manipulator 110. In another example, the gait configuration information may include information related to each link (not shown) to control a gait (such as movement) of the robotic manipulator 110.

In an embodiment, the electronic apparatus 102 may utilize the effector pose information 802A to retrieve control instructions for the robotic manipulator. In another embodiment, the electronic apparatus 102 may utilize at least one of: the grasp force information 802B, the head pose information 802C, or the object pose information 802D of the handheld device 108 to reduce errors in retrieving control instructions for the robotic manipulator 110. The control instructions may correspond to at least one degree-of-freedom (1-DOF) as the inferred arrow direction information, which may be different from the 6-DOF of the handheld device 108. The at least one degree-of-freedom (1-DOF) indicated by the control instructions may be an additional degree-of-freedom (1-DOF) that may be required by the robotic manipulator 110 to perform the task, where only six degrees-of-freedom (6-DOF) poses are performed by the handheld device 108 for the task. Thus, the control instructions including the additional degree-of-freedom (1-DOF) may supplement missing information (i.e. missing from 6-DOF of the handheld device 108) for the effective control of the robotic manipulator 110 (i.e. humanoid robot).

It may be noted here that the robotic manipulator 110 shown in FIG. 9 is presented merely as an example. The present disclosure may also be applicable to other robotic manipulators (such as a robotic manipulator with two or more effector, or a bipedal robotic manipulator, and the like), without deviation from the scope of the disclosure. Further, one skilled in the art may understand the task (such as the pick and/or place task) and the poses (such as the first pose 902A and the second pose 902B) are presented merely as an example. The present disclosure may also be applicable to other tasks and other poses of the robotic manipulator 110, without deviation from the scope of the disclosure.

Figure 10:
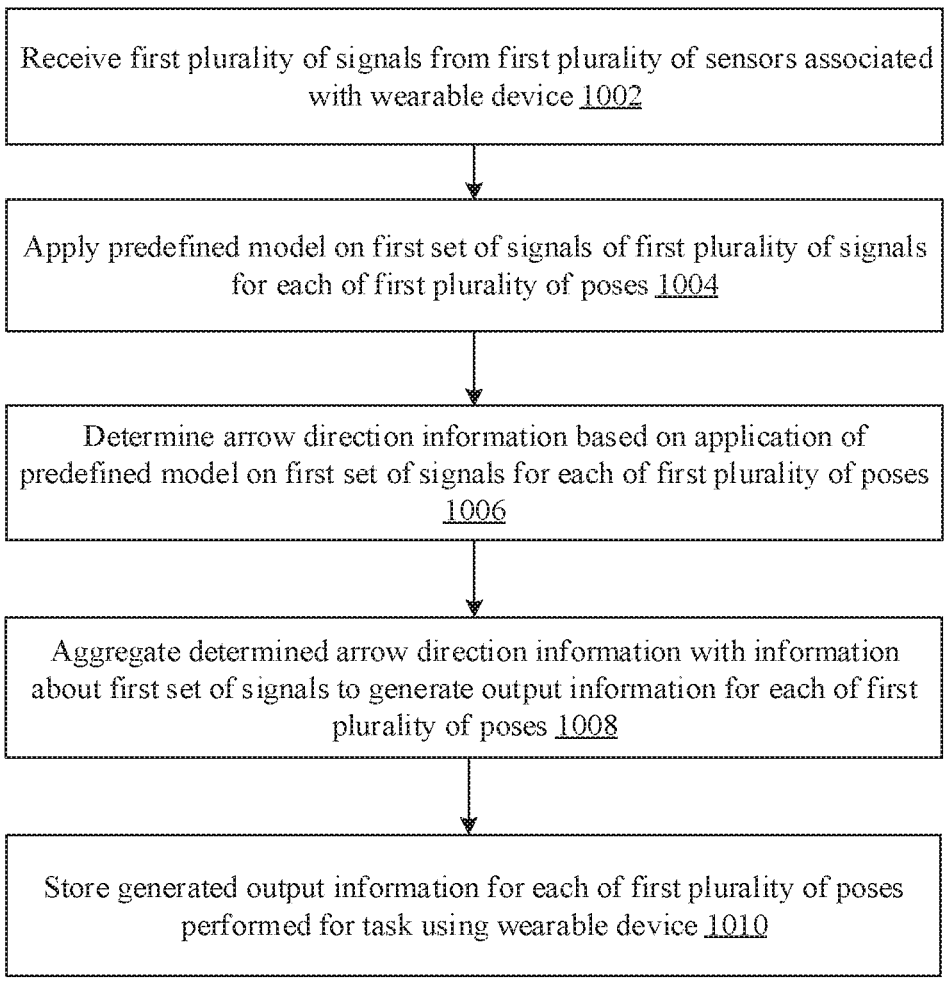
FIG. 10 is a flowchart that illustrates exemplary operations for a construction of a database to control a robotic manipulator, in accordance with an embodiment of the disclosure.

FIG. 10 is a flowchart that illustrates exemplary operations for a construction of a database to control a robotic manipulator, in accordance with an embodiment of the disclosure. With reference to FIG. 10, there is shown a flowchart 1000. The flowchart 1000 is described in conjunction with FIGS. 1, 2, 3A-3B, 4, 5, 6, 7, 8, and 9. The operations from 1002 to 1010 may be implemented, for example, by the electronic apparatus 102, or the circuitry 202 of FIG. 2. The operations of the flowchart 1000 may start at 1002.

At 1002, the first plurality of signals may be received. In an embodiment, the electronic apparatus may be configured to receive the first plurality of signals from the first plurality of sensors 104A associated with the wearable device 104, as described, for example, in FIGS. 1, 3A, 3B, 4, and at 502 in FIG. 5.

At 1004, the predefined model may be applied. In an embodiment, the electronic apparatus 102 may be configured to apply the predefined model on the first set of signals of the first plurality of signals for each of first plurality of poses (such as the first plurality of poses 404A-404B). The predefined model may include the first algorithm (such as the inverse-kinematics algorithm) and the second algorithm (such as the Bayesian Interaction Primitive (BIP)), which may be applied on the first set of signals. The first set of signals may correspond to the one or more positional and orientational coordinates of at least one effector 402A of the wearable device 104, as described, for example, in FIGS. 1, 2, and at 504 in FIG. 5.

At 1006, the arrow direction information may be determined. In an embodiment, the electronic apparatus 102 may determine the arrow direction information based on the application of the predefined model on the first set of signals for each of the first plurality of poses 404. The arrow direction information may relate to the joint angle information for the robotic manipulator 110 to perform the task, as described for example, in FIGS. 1, 2, 6, and at 506 in FIG. 5.

At 1008, the determined arrow direction information may be aggregated with information about the first set of signals to generate the output information for each of the first plurality of poses. In an embodiment, the electronic apparatus 102 may be configured to aggregate the determined arrow direction information with information about the first set of signals to generate output information for each of the first plurality of poses 404, as described for example, in FIG. 1 and at 508 in FIG. 5.

At 1010, the generated output information may be stored. In an embodiment, the electronic apparatus 102 may be configured to control the memory 204 (i.e. including the database 514) to store the generated output information for each of the first plurality of poses 404A-404B performed for the task using the wearable device 104 as described for example, in FIG. 1, and at 510, 512 and 514 in FIG. 5. Control may pass to end.

Figure 11:
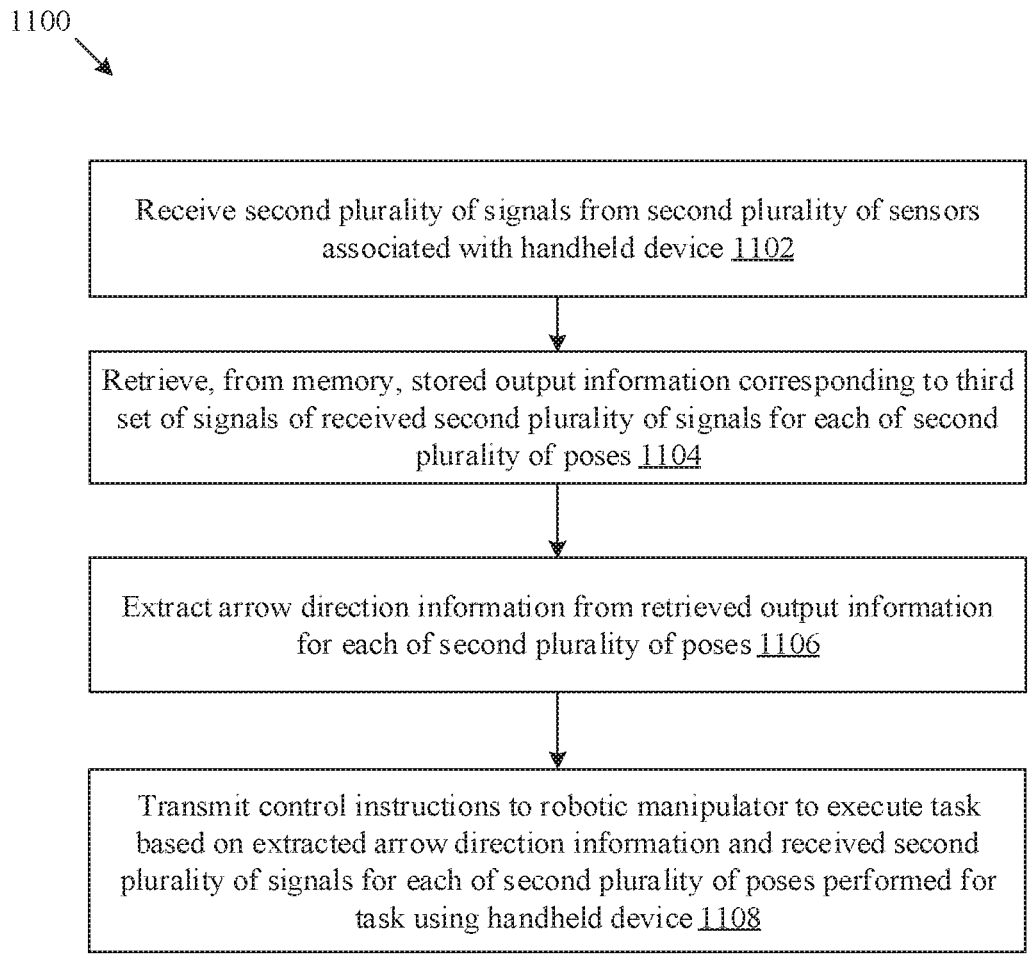
FIG. 11 is a flowchart that illustrates exemplary operations for a control of a robotic manipulator through a database associated with the electronic apparatus of FIG. 1, in accordance with an embodiment of the disclosure.

FIG. 11 is a flowchart that illustrates exemplary operations for a control of a robotic manipulator through a database associated with the electronic apparatus of FIG. 1, in accordance with an embodiment of the disclosure. With reference to FIG. 11, there is shown a flowchart 1100. The flowchart 1000 is described in conjunction with FIGS. 1, 2, 3A-3B, 4, 5, 6, 7, 8, 9, and 10. The operations from 1102 to 1108 may be implemented, for example, by the electronic apparatus 102, or the circuitry 202 of FIG. 2. The operations of the flowchart 1000 may start at 1002.

At 1102, the second plurality of signals may be received. In an embodiment, the electronic apparatus 102 may receive the second plurality of signals from the second plurality of sensors 108A associated with the handheld device 108. The second plurality of signals may correspond to each of a second plurality of poses (such as the second plurality of poses 704A-704B) performed for the task using the handheld device 108, as described for example, in FIGS. 1, 7, and at 802 in FIG. 8.

At 1104, the stored output information may be retrieved. In an embodiment, the electronic apparatus 102 may retrieve, from the memory 204 (i.e. the database 514), the stored output information that may correspond to the third set of signals of the received second plurality of signals for each of the second plurality of poses 704A-704B. The third set of signals correspond to the one or more positional and orientational coordinates of the at least one effector 702A of the handheld device 108, as described for example, in FIG. 1, and at 804 and 806 in FIG. 8.

At 1106, the arrow direction information may be extracted. In an embodiment, the electronic apparatus 102 may extract the arrow direction information from the retrieved output information for each of the second plurality of poses 704A-704B, as described for example, in FIG. 1, and at 808 in FIG. 8.

At 1108, the control instructions may be transmitted to the robotic manipulator 110. In an embodiment, the electronic apparatus 102 may transmit the control instructions to the robotic manipulator 110 to execute the task based on the extracted arrow direction information and the received second plurality of signals for each of the second plurality of poses 704A-704B performed for the task using the handheld device 108, as described for example, in FIG. 1, at 810 and 812 in FIG. 8, and in FIG. 9. The control may pass to end.

Various embodiments of the disclosure may provide a non-transitory, computer-readable medium and/or storage medium, and/or a non-transitory machine readable medium and/or storage medium stored thereon, a set of instructions executable by a machine and/or a computer (for example the electronic apparatus 102) for the construction of the database 514. The set of instructions may be executable by the machine and/or the computer (for example the electronic apparatus 102) to perform operations that may include reception of a first plurality of signals from a first plurality of sensors associated with a wearable device. The first plurality of signals may correspond to each of a first plurality of poses performed for the task using the wearable device. The operation may further include application of a predefined model on a first set of signals of the first plurality of signals for each of the first plurality of poses. The first set of signals may correspond to one or more positional and orientational coordinates of at least one part of the wearable device. The operations may further include determination of arrow direction information based on the application of the predefined model on the first set of signals for each of the first plurality of poses. The arrow direction information may relate to joint angle information for the robotic manipulator to perform the task. The operations may further include aggregation of the determined arrow direction information with information about the first set of signals to generate output information for each of the first plurality of poses. The operations may further include control of a memory to store the generated output information for each of the first plurality of poses performed for the task using the wearable device.

Various embodiments of the disclosure may further provide a non-transitory, computer-readable medium and/or storage medium, and/or a non-transitory machine readable medium and/or storage medium stored thereon, a set of instructions executable by a machine and/or a computer (for example the electronic apparatus 102) for the control of the robotic manipulator 110. The set of instructions may be executable by the machine and/or the computer (for example the electronic apparatus 102) to perform operations that may include storage of output information for each of a first plurality of poses performed for a task using a wearable device. The output information may include arrow direction information associated with each of the first plurality of poses performed for the task. The operations may further include reception of a second plurality of signals from a second plurality of sensors associated with a handheld device. The second plurality of signals may correspond to each of a second plurality of poses performed for the task using the handheld device. The operations may further include retrieval of the stored output information corresponding to a third set of signals of the received second plurality of signals for each of the second plurality of poses. The third set of signals may correspond to one or more positional and orientational coordinates of at least one part of the handheld device. The operations may further include extraction of the arrow direction information from the retrieved output information for each of the second plurality of poses. The operations may further include transmission of control instructions to the robotic manipulator to execute the task based on the extracted arrow direction information and the received second plurality of signals for each of the second plurality of poses performed for the task using the handheld device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
   a memory to store information associated with a task of a robotic manipulator; and
   circuitry coupled to the memory, wherein the circuitry:
   receives a first plurality of signals from a first plurality of sensors associated with a wearable device, wherein the first plurality of signals corresponds to each of a first plurality of poses performed for the task using the wearable device;
   applies a predefined model on a first set of signals of the first plurality of signals for each of the first plurality of poses, wherein the first set of signals correspond to one or more positional and orientational coordinates of at least one part of the wearable device;
   determines arrow direction information based on the application of the predefined model on the first set of signals for each of the first plurality of poses, wherein the arrow direction information relates to joint angle information for the robotic manipulator to perform the task;
   aggregates the determined arrow direction information with information about the first set of signals to generate output information for each of the first plurality of poses;
   controls the memory to store the generated output information for each of the first plurality of poses performed for the task using the wearable device;
   receives a second plurality of signals from a second plurality of sensors associated with a handheld device, wherein
      the second plurality of signals correspond to each of a second plurality of poses performed for the task, and
      each of the second plurality of poses is performed using six degrees-of-freedom of the handheld device;
   extracts the arrow direction information from the output information based on each of the second plurality of poses, wherein
      the arrow direction information corresponds to at least one additional degree-of-freedom inferred, from the output information, based on each of the second plurality of poses,
      the at least one additional degree-of-freedom is different from the six degrees-of-freedom of the handheld device, and
      the at least one additional degree of freedom is required by the robotic manipulator in addition to the six degrees-of-freedom to perform the task; and
   transmits control instructions to the robotic manipulator to execute the task based on the extracted arrow direction information and the received second plurality of signals.

2. The electronic apparatus according to claim 1, wherein the predefined model includes a first algorithm, and
the circuitry applies the first algorithm on the first set of signals of the first plurality of signals to determine joint angle data for the robotic manipulator to perform the task.

3. The electronic apparatus according to claim 2,
wherein the predefined model further includes a second algorithm,
wherein the circuitry applies the second algorithm on the determined joint angle data to determine the arrow direction information that relates to the joint angle information for the robotic manipulator to perform the task, and
wherein the arrow direction information includes a vector component that corresponds to directional information of the joint angle information.

4. The electronic apparatus according to claim 3, wherein the first algorithm relates to an inverse kinematics algorithm, the inverse kinematics algorithm analyzes the first set of signals of each of the first plurality of signals to determine the joint angle data, and
wherein the second algorithm relates to a Bayesian Interaction Primitive (BIP), the BIP analyzes the joint angle data to determine the arrow direction information.

5. The electronic apparatus according to claim 1, wherein the arrow direction information further comprises at least one of
elbow arrow direction information associated with an elbow of the robotic manipulator, or
shoulder arrow direction information associated with a shoulder clavicle of the robotic manipulator.

6. The electronic apparatus according to claim 1, wherein the stored output information further comprises at least one of
arm configuration information associated with an upper portion of the wearable device, or
gait configuration information associated with a lower portion of the wearable device, wherein the at least one of the arm configuration information or the gait configuration information relates to the joint angle information for the robotic manipulator to perform the task.

7. The electronic apparatus according to claim 1, wherein the first plurality of sensors are communicatively coupled with the wearable device and detect the first plurality of signals, wherein the first plurality of sensors:
   detects at least one of
      inertial motion information comprising the one or more positional and orientational coordinates, associated with the at least one part of the wearable device, for each of the first plurality of poses performed for the task,
      force information associated with the at least one part of the wearable device for each of the first plurality of poses performed for the task, or
      optical motion information comprising the one or more positional and orientational coordinates, associated with the at least one part of the wearable device, for each of the first plurality of poses performed for the task; and
   transmits the first plurality of signals, indicating at least one of the inertial motion information, the force information, or the optical motion information, to the electronic apparatus to determine the arrow direction information.

8. The electronic apparatus according to claim 1,
   wherein the first plurality of signals further comprises a second set of signals,
   wherein the second set of signals correspond to object information which indicates at least one of a grasp force, a head pose, or an object pose, for each of the first plurality of poses performed for the task, and
   wherein the circuitry further:
      aggregates the determined arrow direction information with the information about the first set of signals, and with the object information about the second set of signals, to generate the output information for each of the first plurality of poses; and
      controls the memory to store the generated output information for each of the first plurality of poses performed for the task using the wearable device.

9. The electronic apparatus according to claim 8, wherein the circuitry further:
   retrieves, from the memory, the stored output information corresponding to a fourth set of signals of the received second plurality of signals for each of the second plurality of poses, wherein the fourth set of signals correspond to at least one of the grasp force, the head pose, or the object pose performed for the task using the handheld device;
   extracts at least one of the arrow direction information or the object information, from the retrieved output information for each of the second plurality of poses; and
   transmits the control instructions to the robotic manipulator to execute the task based on the at least one of the arrow direction information or the object information, and based on the received second plurality of signals for each of the second plurality of poses performed for the task using the handheld device.

10. The electronic apparatus according to claim 9, wherein the circuitry further determines at least one of
   object trajectory information for the robotic manipulator from the object information, the object trajectory information is associated with an object of the task, wherein the object trajectory information is based on at least one of the second set of signals or the fourth set of signals, that corresponds to the task, or
   grasp force information for the robotic manipulator from the object information, the grasp force information is associated with a force required to hold the object for the task, wherein the grasp force information is based on at least one of the second set of signals or the fourth set of signals, that corresponds to the task.

11. The electronic apparatus according to claim 1,
   wherein the at least one part of the wearable device is at least one effector of the wearable device that performs a first set of poses of the first plurality of poses, and
   wherein the first set of signals corresponds to the one or more positional and orientational coordinates of the first set of poses of the at least one effector of the wearable device.

12. The electronic apparatus according to claim 1, wherein the circuitry further:
   retrieves, from the memory, the stored output information corresponding to a third set of signals of the received second plurality of signals for each of the second plurality of poses, wherein the third set of signals correspond to one or more positional and orientational coordinates of at least one part of the handheld device.

13. The electronic apparatus according to claim 12, wherein the circuitry further:
   compares information about the third set of signals for each of the second plurality of poses, with the output information stored in the memory, related to the first set of signals for each of the first plurality of poses; and
   retrieves, from the memory, the stored output information corresponding to the third set of signals for each of the second plurality of poses based on the comparison.

14. The electronic apparatus according to claim 12, wherein the circuitry further:
   compares information about the third set of signals for each of the second plurality of poses, with the output information stored in the memory, related to the first set of signals for each of the first plurality of poses;
   retrieves, from the memory, the stored output information corresponding to different poses related to the first set of signals based on the comparison; and
   calculates mean information of the arrow direction information for the retrieved output information corresponding to the different poses related to the first set of signals.

15. The electronic apparatus according to claim 12, wherein
   the second plurality of sensors are communicatively coupled with the handheld device and detect the second plurality of signals, and
   the second plurality of sensors:
      detects at least one of motion information associated with the at least one part of the handheld device for each of the second plurality of poses performed for the task, or force information associated with the at least one part of the handheld device for each of the second plurality of poses performed for the task; and
      transmits the second plurality of signals, indicating at bast one of the detected at least one of the motion information or the force information, to the electronic apparatus to retrieve the stored output information.

16. A method, comprising:
   in an electronic apparatus:
      receiving a first plurality of signals from a first plurality of sensors associated with a wearable device, wherein the first plurality of signals corresponds to each of a first plurality of poses performed for a task using the wearable device;

applying a predefined model on a first set of signals of the first plurality of signals for each of the first plurality of poses, wherein the first set of signals correspond to one or more positional and orientational coordinates of at least one part of the wearable device;

determining arrow direction information based on the application of the predefined model on the first set of signals for each of the first plurality of poses, wherein the arrow direction information relates to joint angle information for a robotic manipulator to perform the task;

aggregating the determined arrow direction information with information about the first set of signals to generate output information for each of the first plurality of poses;

storing, in a memory, the generated output information for each of the first plurality of poses performed for the task using the wearable device;

receiving a second plurality of signals from a second plurality of sensors associated with a handheld device, wherein
the second plurality of signals correspond to each of a second plurality of poses performed for the task, and
each of the second plurality of poses is performed using six degrees-of-freedom of the handheld device;

extracting the arrow direction information from the output information based on each of the second plurality of poses, wherein
the arrow direction information corresponds to at least one additional degree-of-freedom inferred, from the output information, based on each of the second plurality of poses,
the at least one additional degree-of-freedom is different from the six degrees-of-freedom of the handheld device, and
the at least one additional degree of freedom is required by the robotic manipulator in addition to the six degrees-of-freedom to perform the task; and transmitting control instructions to the robotic manipulator to execute the task based on the extracted arrow direction information and the received second plurality of signals.

17. The method according to claim 16, further comprising:
retrieving, from the memory, the stored output information corresponding to a third set of signals of the received second plurality of signals for each of the second plurality of poses, wherein the third set of signals correspond to one or more positional and orientational coordinates of at least one part of the handheld device.

18. An electronic apparatus, comprising:
a memory to store output information for each of a first plurality of poses performed for a task using a wearable device, wherein the output information comprises arrow direction information associated with each of the first plurality of poses performed for the task; and circuitry coupled to the memory, wherein the circuitry:
receives a second plurality of signals from a second plurality of sensors associated with a handheld device, wherein
the second plurality of signals correspond to each of a second plurality of poses performed for the task using the handheld device and
each of the second plurality of poses is performed using six degrees-of-freedom of the handheld device;

retrieves, from the memory, the stored output information corresponding to a third set of signals of the received second plurality of signals for each of the second plurality of poses, wherein the third set of signals correspond to one or more positional and orientational coordinates of at least one part of the handheld device;

extracts the arrow direction information from the retrieved output information for each of the second plurality of poses, wherein
the arrow direction information corresponds to at least one additional degree-of-freedom inferred, from the output information, based on each of the second plurality of poses,
the at least one additional degree-of-freedom is different from the six degrees-of-freedom of the handheld device, and
the at least one additional degree of freedom is required by a robotic manipulator in addition to the six degrees-of-freedom to perform the task; and transmits control instructions to the robotic manipulator to execute the task based on the extracted arrow direction information and the received second plurality of signals.

* * * * *